US009635621B2

(12) United States Patent
Papasakellariou et al.

(10) Patent No.: US 9,635,621 B2
(45) Date of Patent: Apr. 25, 2017

(54) ADAPTATIONS OF DUAL CONNECTIVITY OPERATION TO UE CAPABILITY

(71) Applicant: Samsung Electronics Co., Ltd., Suwon-si, Gyeonggi-do (KR)

(72) Inventors: Aris Papasakellariou, Houston, TX (US); Boon Loong Ng, Plano, TX (US); Ying Li, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/595,827

(22) Filed: Jan. 13, 2015

(65) Prior Publication Data

US 2015/0208366 A1    Jul. 23, 2015

Related U.S. Application Data

(60) Provisional application No. 61/928,900, filed on Jan. 17, 2014, provisional application No. 61/930,837, (Continued)

(51) Int. Cl.
*H04W 52/02* (2009.01)
*H04W 52/14* (2009.01)
(Continued)

(52) U.S. Cl.
CPC ........... *H04W 52/34* (2013.01); *H04L 1/1861* (2013.01); *H04L 5/0048* (2013.01);
(Continued)

(58) Field of Classification Search
CPC ... H04L 1/1845; H04L 1/1861; H04L 5/0007; H04L 5/0048; H04W 28/18;
(Continued)

(56) References Cited

U.S. PATENT DOCUMENTS

2008/0207150 A1*  8/2008  Malladi ................. H04W 52/08
                                                      455/127.1
2011/0319120 A1* 12/2011  Chen .................... H04W 52/367
                                                      455/522
(Continued)

OTHER PUBLICATIONS

3GPP TSG RAN WG2 Meeting #81; "Discussion on dual connectivity for small cell"; R2-130292; St. Julian's, Malta; Jan. 28-Feb. 1, 2013; 3 pages.
(Continued)

*Primary Examiner* — Andrew Lai
*Assistant Examiner* — M Mostazir Rahman

(57) ABSTRACT

Methods and apparatus are provided for a User Equipment (UE) configured by a Master enhanced NodeB (MeNB) for operation with dual connectivity to a Secondary eNB (SeNB) to transmit acknowledgement information when the UE is power limited and for a respective eNB to determine a UE power limitation. Methods and apparatus are also provided for the UE, the MeNB, and the SeNB to adjust operation according to a partitioning of a UE capability between the MeNB and the SeNB. The UE capability can be a transmission power, a soft buffer size, a reception or a transmission of a number of data transport block bits, or a number of decoding operations.

8 Claims, 12 Drawing Sheets

Related U.S. Application Data filed on Jan. 23, 2014, provisional application No. 61/996,671, filed on May 14, 2014.

(51) Int. Cl.

| | | |
|---|---|---|
| *H04W 52/34* | (2009.01) | |
| *H04W 52/24* | (2009.01) | |
| *H04W 52/28* | (2009.01) | |
| *H04W 52/32* | (2009.01) | |
| *H04W 52/48* | (2009.01) | |
| *H04W 72/12* | (2009.01) | |
| *H04W 28/18* | (2009.01) | |
| *H04W 72/04* | (2009.01) | |
| *H04L 1/18* | (2006.01) | |
| *H04L 5/00* | (2006.01) | |

(52) U.S. Cl.
CPC ..... *H04W 52/0212* (2013.01); *H04W 52/146* (2013.01); *H04W 52/244* (2013.01); *H04W 52/281* (2013.01); *H04W 52/325* (2013.01); *H04W 52/48* (2013.01); *H04W 72/1263* (2013.01); *H04L 1/1845* (2013.01); *H04L 5/0007* (2013.01); *H04W 28/18* (2013.01); *H04W 72/0446* (2013.01); *H04W 72/1289* (2013.01)

(58) Field of Classification Search
CPC ........... H04W 52/0212; H04W 52/146; H04W 52/244; H04W 52/281; H04W 52/325; H04W 52/34; H04W 52/48; H04W 72/0446; H04W 72/1263
See application file for complete search history.

(56) References Cited

U.S. PATENT DOCUMENTS

| | | | | |
|---|---|---|---|---|
| 2014/0071903 A1* | 3/2014 | Sorrentino | .......... | H04W 52/325 370/329 |
| 2014/0119304 A1* | 5/2014 | Li | ............ | H04W 52/146 370/329 |
| 2014/0192738 A1 | 7/2014 | Nam et al. | | |
| 2014/0192740 A1* | 7/2014 | Ekpenyong | .......... | H04L 5/0035 370/329 |
| 2014/0269452 A1* | 9/2014 | Papasakellariou | ... | H04B 7/2643 370/280 |

OTHER PUBLICATIONS

3GPP TSG RAN WG #84; "BSR Reporting Options for Dual Connectivity"; R2-133935; San Francisco, USA; Nov. 11-15, 2013; 3 pages.

3GPP TSG RAN WG2 #84; "Uplink transmission power management and PHR reporting for dual connectivity"; R2-133935; San Francisco, USA; Nov. 11-15, 2013; 3 pages.

3GPP TSG RAN WG2 #84; "Considerations on power control for Dual Connectivity"; R2-134234; San Francisco, USA; Nov. 11-15, 2013; 4 pages.

International Search Report dated Feb. 25, 2015 in connection with International Patent Application No. PCT/KR2015/000540, 3 pages.

Written Opinion of International Searching Authority dated Feb. 25, 2015 in connection with International Patent Application No. PCT/KR2015/000540, 4 pages.

3GPP TS 36.211; ETSI TS 136 211 V11.2.0; Technical Specification; LTE; Evolved Universal Terrestrial Radio Access (E-UTRA); Physical channels and modulation; Apr. 2013; 111 pgs.

3GPP TS 36.212; ETSI TS 136 212 V11.2.0; Technical Specification; LTE; Evolved Universal Terrestrial Radio Access (E-UTRA); Multiplexing and channel coding; Apr. 2013; 84 pgs.

3GPP TS 36.213; ETSI TS 136 213 V11.2.0; Technical Specification; LTE; Evolved Universal Terrestrial Radio Access (E-UTRA); Physical layer procedures; Apr. 2013; 175 pgs.

3GPP TS 36.321; ETSI TS 136 321 V11.2.0; Technical Specification; LTE; Evolved Universal Terrestrial Radio Access (E-UTRA); Medium Access Control (MAC) protocol specification; Apr. 2013; 58 pgs.

3GPP TS 36.331; ETSI TS 136 331 V11.2.0; Technical Specification; LTE; Evolved Universal Terrestrial Radio Access (E-UTRA); Radio Resource Control (RRC); Protocol specification; Feb. 2013; 345 pgs.

3GPP TS 36.214; ETSI TS 136 214 V11.1.0; Technical Specification; LTE; Evolved Universal Terrestrial Radio Access (E-UTRA); Physical layer; Measurements; Feb. 2013; 16 pgs.

3GPP TS 36.306; V11.2.0; Technical Specification; Group Radio Access Network; Evolved Universal Terrestrial Radio Access (E-UTRA); User Equipment (UE) radio access capabilities; Release 11; Dec. 2012; 26 pgs.

3GPP TS 36.304; ETSI TS 136 304 V11.3.0; Technical Specification; LTE; Evolved Universal Terrestrial Radio Access (E-UTRA); User Equipment (UE) procedures in idle mode; Release 11; Apr. 2013; 36 pgs.

\* cited by examiner

ADAPTATIONS OF DUAL CONNECTIVITY OPERATION TO UE CAPABILITY

CROSS-REFERENCE TO RELATED APPLICATION AND CLAIM OF PRIORITY

The present application claims priority under 35 U.S.C. §119(e) to U.S. Provisional Patent Application Ser. No. 61/928,900 filed Jan. 17, 2014, entitled "Power Limited Operation in Dual Connectivity," U.S. Provisional Patent Application Ser. No. 61/930,837 filed Jan. 23, 2014, entitled "Adaptation of a UE Capability for Operation with Dual Connectivity," and U.S. Provisional Patent Application Ser. No. 61/996,671 filed May 14, 2014, entitled "Partitioning UE Capabilities for Dual Connectivity." The contents of the above-identified patent documents are incorporated herein by reference.

TECHNICAL FIELD

The present application relates generally to wireless communications and, more specifically, to downlink or uplink transmissions in dual connectivity operation.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to support transmissions from a User Equipment (UE) in dual connectivity operation.

In a first embodiment, a method is provided. The method includes generating, by a User Equipment (UE), first acknowledgement information in response to a reception of one or more first data transport blocks. The method additionally includes determining, by the UE, a first power for transmitting a first physical uplink shared channel (PUSCH) in a subframe (SF) in a first cell from a first cell group according to a respective power control formula, a first power for transmitting a first physical uplink control channel (PUCCH) in the SF in a primary cell of the first cell group according to a respective power control formula, and a first available power for transmitting in the SF in the first cell group. The method also includes comparing, by the UE, the first power for transmitting the first PUSCH and the first available power or the first power for transmitting the PUCCH and the first available power. The method further includes transmitting, by the UE, the first acknowledgement information either in the first PUSCH if the first power for transmitting the first PUSCH is smaller than or equal to the first available power, or in the first PUCCH if the first power for transmitting the first PUSCH is larger than the first available power and the first power for transmitting the first PUCCH is smaller than or equal to the first available power.

In a second embodiment, a method is provided. The method includes receiving, by a first base station, signaling informing of parameters for communication between a User Equipment (UE) and a second base station. The method additionally includes determining, by the first base station, a first subframe (SF) set and a second SF set for the second base station based on the signaling. The method also includes scheduling, by the first base station, a transmission of one or more data transport blocks to the UE or a transmission of one or more data transport blocks from the UE in a SF according to whether the SF overlaps with one or more SFs from the first SF set or with one or more SFs from the second SF set.

In a third embodiment, a method is provided. The method includes receiving, by a User Equipment (UE), data transport blocks from a first base station and from a second base station and signaling informing of an adaptation of parameters for communication with the second base station. The method additionally includes, adjusting, by the UE, a partitioning of the UE soft buffer for receptions of data transport blocks from the first base station and for receptions of data transport blocks from the second base station according to the adaptation of the parameters.

In a fourth embodiment, a User Equipment (UE) is provided. The UE includes a receiver, a processor, a comparator, and a transmitter. The receiver is configured to receive first data transport blocks and generate respective first acknowledgement information. The processor is configured to compute a first power for transmitting a first physical uplink shared channel (PUSCH) in a subframe (SF) in a first cell from a first cell group according to a respective power control formula, a first power for transmitting a first physical uplink control channel (PUCCH) in the SF in a primary cell of the first cell group according to a respective power control formula, and a first available power for transmitting in the SF in the first cell group. The comparator is configured to determine if the first power for transmitting the first PUSCH is smaller than or equal to the first available power, or if the first power for transmitting the first PUCCH is smaller than or equal to the first available power. The transmitter is configured to transmit the first acknowledgement information in the first PUSCH if the first power for transmitting the first PUSCH is smaller than or equal to the first available power, or in the first PUCCH if the first power for transmitting the first PUSCH is larger than the first available power and the first power for transmitting the first PUCCH is smaller than or equal to the first available power.

In a fifth embodiment, a base station is provided. The base station includes a receiver, a processor, and a scheduler. The receiver is configured to receive signaling informing of parameters for communication between a User Equipment (UE) and a second base station. The processor is configured to determine a first SF set and a second SF set for the second base station based on the signaling. The scheduler is configured to schedule a transmission of one or more data transport blocks to the UE or a transmission of one or more data transport blocks from the UE in a SF according to whether the SF overlaps with one or more SFs from the first SF set or with one or more SFs from the second SF set.

In a sixth embodiment, a User Equipment (UE) is provided. The UE includes a receiver and a processor. The receiver is configured to receive data transport blocks from a first base station and from a second base station and signaling informing of an adaptation of parameters for communication with the second base station. The processor is configured to adjust a partitioning of a soft buffer for receptions of data transport blocks from the first base station and for receptions of data transport blocks from the second base station according to the adaptation of the parameters.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v 11.2.0, "E-UTRA, Physical channels and modulation" (REF 1); 3GPP TS 36.212 v 11.2.0, "E-UTRA, Multiplexing and Channel coding" (REF 2); 3GPP TS 36.213 v 11.2.0, "E-UTRA, Physical Layer Procedures" (REF 3); 3GPP TS 36.321 v 11.2.0, "E-UTRA, Medium Access Control (MAC) protocol specification" (REF 4); 3GPP TS 36.331 v 11.2.0, "E-UTRA, Radio Resource Control (RRC) Protocol Specification" (REF 5); 3GPP TS 36.214 v 11.2.0, "Evolved Universal Terrestrial Radio Access (E-UTRA); Physical Layer Measurements" (REF 6), 3GPP TS 36.306 v 11.2.0, "Evolved Universal Terrestrial Radio Access (E-UTRA); User Equipment (UE) Radio Access Capabilities" (REF 7), 3GPP TS 36.304 v 11.2.0, "Evolved Universal Terrestrial Radio Access (E-UTRA); User Equipment (UE) procedures in idle mode" (REF 8), and US Patent Publication 2014/0192738, filed on Jan. 8, 2014 and entitled "UPLINK CONTROL INFORMATION TRANSMISSIONS/RECEPTIONS IN WIRELESS NETWORKS" (REF 9).

One or more embodiments of the present disclosure relate to downlink and uplink transmissions in dual connectivity operation. A wireless communication network includes a DownLink (DL) that conveys signals from transmission points, such as base stations or enhanced NodeBs (eNBs), to UEs. The wireless communication network also includes an UpLink (UL) that conveys signals from UEs to reception points, such as eNBs.

Figure 1:
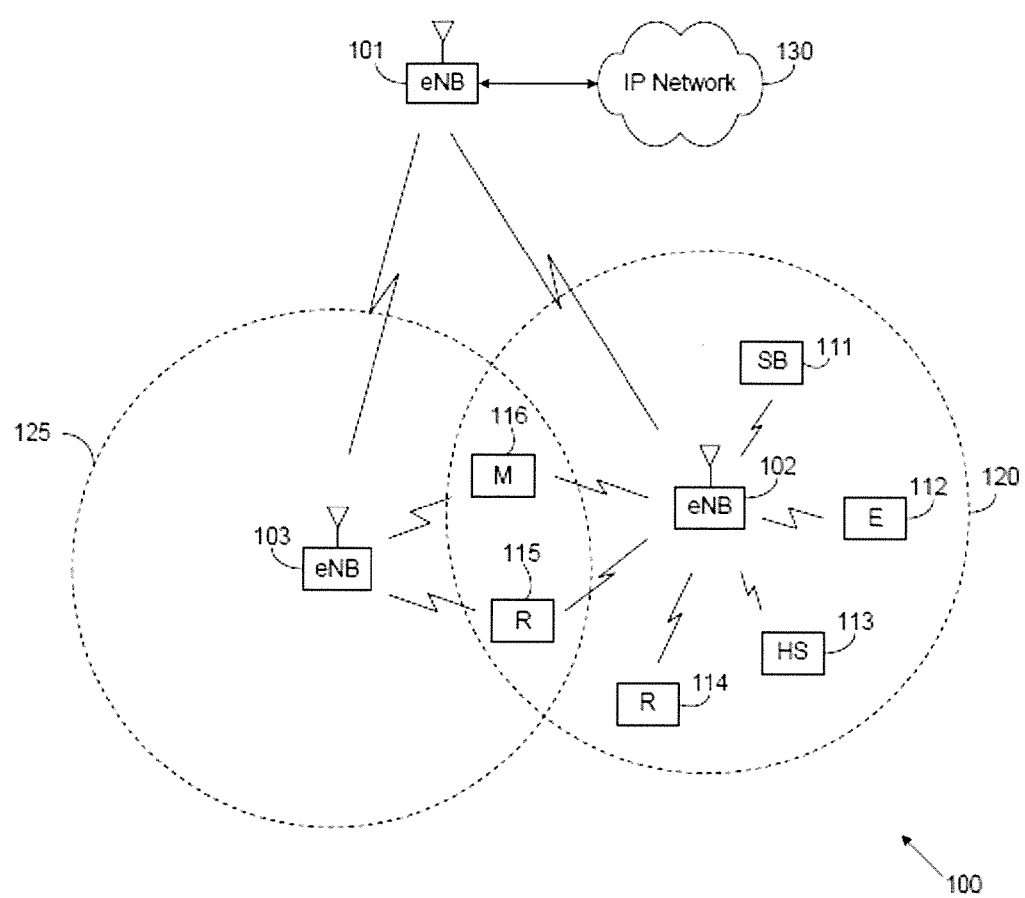
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE, may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 115, which may be located in a first residence (R); a UE 116, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100. That is, one or more of the eNBs 101-103 can provide support for DL or UL transmissions in dual connectivity operation.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly between them or with the network 130 and provide UEs with direct wireless broadband access to the network 130. Further, the eNB 101, 102, and/or 103 could provide access to other or additional external networks, such as external telephone networks or other types of data networks.

Figure 2:
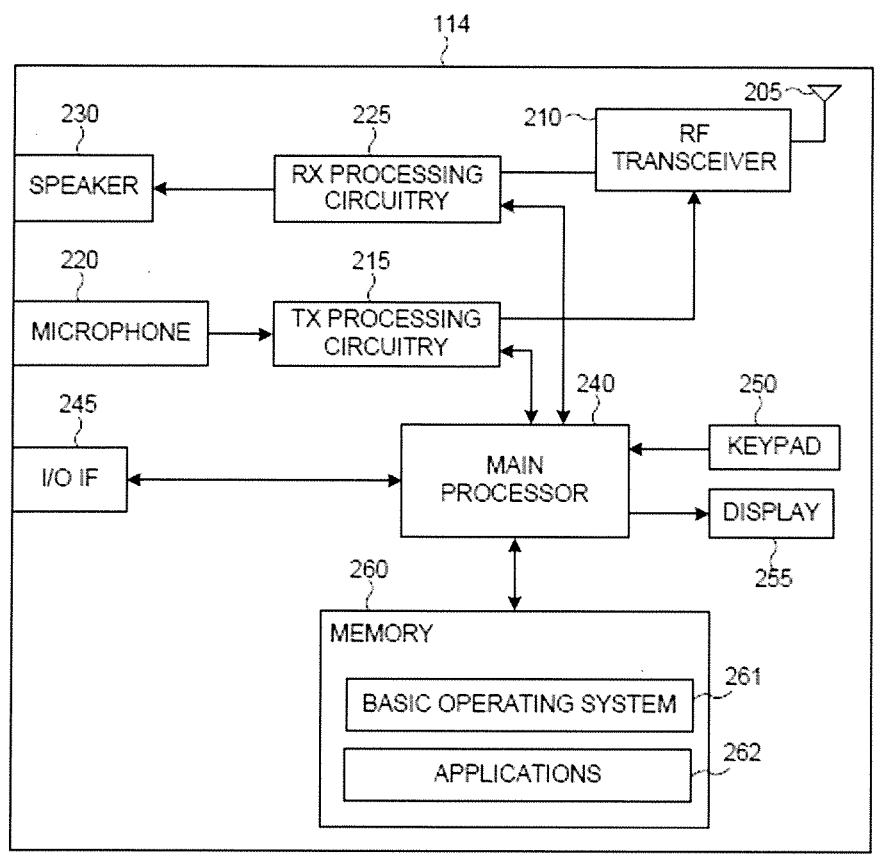
FIG. 2 illustrates an example user equipment (UE) according to this disclosure.

FIG. 2 illustrates an example UE 116 according to this disclosure. The embodiment of the UE 116 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 116 includes an antenna 205, a radio frequency (RF) transceiver 210, transmit (TX) processing circuitry 215, a microphone 220, and receive (RX) processing circuitry 225. The UE 116 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 116. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260 such as operations for a dual connectivity operation including: adjusting a partitioning of a soft buffer for receptions of data transport blocks from a first base station and for receptions of data transport blocks from a second base station according to the adaptation of the parameters; and computing a first power for transmitting a first physical uplink shared channel (PUSCH) in a subframe (SF) in a first cell from a first cell group according to a respective power control formula, a first power for transmitting a first physical uplink control channel (PUCCH) in the SF in a primary cell of the first cell group according to a respective power control formula, and a first available power for transmitting in the SF in the first cell group. In certain embodiments, the UE 116 includes a scheduler configured to schedule a transmission of one or more data transport blocks to the UE or a transmission of one or more data transport blocks from the UE in a SF according to whether the SF overlaps with one or more SFs from the first SF set or with one or more SFs from the second SF set. In certain embodiments, the UE includes a comparator configured to determine if the first power for transmitting the first PUSCH is smaller than or equal to the first available power, or if the first power for transmitting the first PUCCH is smaller than or equal to the first available power. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 116 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 116 can use the keypad 250 to enter data into the UE 116. The display 255 may be a liquid crystal display or other display capable of rendering text and/or at least limited graphics, such as from web sites. The display 255 could also represent a touch-screen.

The memory 260 is coupled to the main processor 240. Part of the memory 260 could include a control or data signaling memory (RAM), and another part of the memory 260 could include a Flash memory or other read-only memory (ROM).

As described in more detail below, the transmit and receive paths of the UE 116 (implemented using the RF transceiver 210, TX processing circuitry 215, and/or RX processing circuitry 225) support DL or UL transmissions in dual connectivity operation.

Although FIG. 2 illustrates one example of UE 116, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 116 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
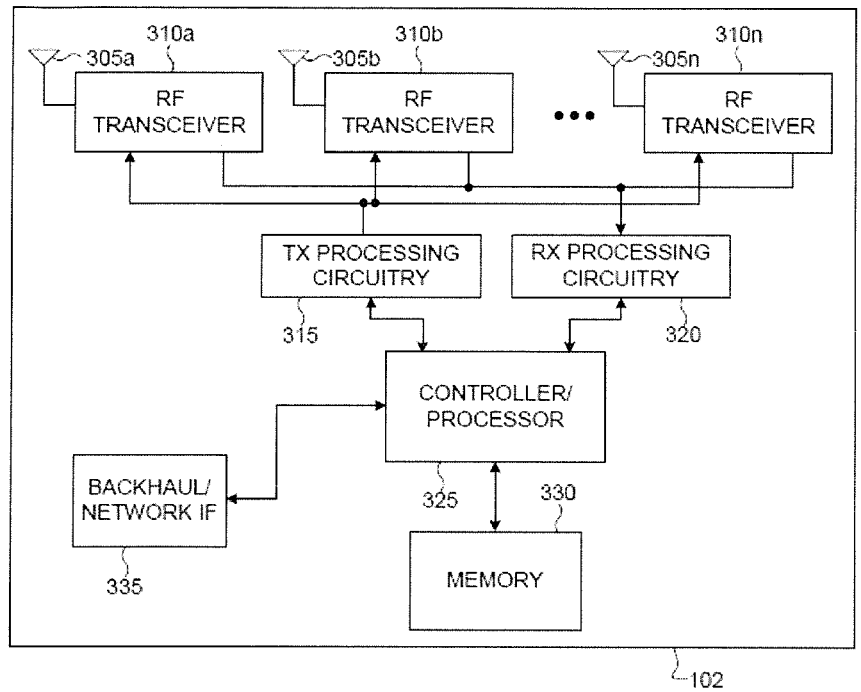
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS and for operations for supporting a dual connectivity operation including determining a first SF set and a second SF set for a second base station based on the signaling. In certain embodiments, the base station includes a scheduler configured to schedule a transmission of one or more data transport blocks to the UE or a transmission of one or more data transport blocks from the UE in a SF according to whether the SF overlaps with one or more SFs from the first SF set or with one or more SFs from the second SF set. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs, such as eNB 103, over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support DL or UL transmissions in dual connectivity operation.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks UL signals include data signals conveying information content, control signals conveying UL Control Information (UCI), and Reference Signals (RS). A transmission time unit for UL or DL data or control information is a Sub-Frame (SF). A number of 10 SFs is referred to as a frame. UE 116 can transmit data information or UCI in a Physical UL Shared CHannel (PUSCH). UE 116 can also transmit UCI in a Physical UL Control CHannel (PUCCH). UCI includes Hybrid Automatic Repeat reQuest ACKnowledgement (HARQ-ACK) information, indicating correct (positive ACK) or incorrect (Negative ACK (NACK)) detection by UE 116 of data Transport Blocks (TBs) for a respective DL HARQ process or of a DCI format indicating a release of a Semi-Persistently Scheduled (SPS) PDSCH, Scheduling Request (SR) indicating whether UE 116 has data in its buffer, and Channel State Information (CSI) indicating DL channel characteristics that UE 116 experiences and enabling eNB 102 to select appropriate parameters for link adaptation of DL transmissions to UE 116. HARQ-ACK information can also include an indication for an absence of any detection (DTX) that can be implicit, if there is no HARQ-ACK signal transmission, or explicit if missed detections can be identified by other means (see also REF 2). NACK and DTX can be represented with a same NACK/DTX state (see also REF 3).

UL RS includes DeModulation RS (DMRS) and Sounding RS (SRS)—see also REF 1. UE 116 transmits DMRS only in a BandWidth (BW) of an associated PUSCH or PUCCH transmission and eNB 102 can use the DMRS to demodulate information in the associated PUSCH or PUCCH. UE 116 transmits SRS to provide eNB 102 with an UL CSI. UE 116 can transmit a DMRS through a Constant Amplitude Zero Auto-Correlation sequence such as a Zad-off-Chu sequence. For a PUSCH transmission, UE 116 is signaled a Cyclic Shift (CS) and an Orthogonal Covering Code (OCC) index to apply to a DMRS transmission through a "CS and OCC" field in a DCI format scheduling the PUSCH transmission (see also REF 1 and REF 2). For SPS PUSCH, a CS and OCC value is configured to UE 116 by eNB 102. The "CS and OCC" field can include, for example, by 3 binary elements and have 8 values.

Figure 4:
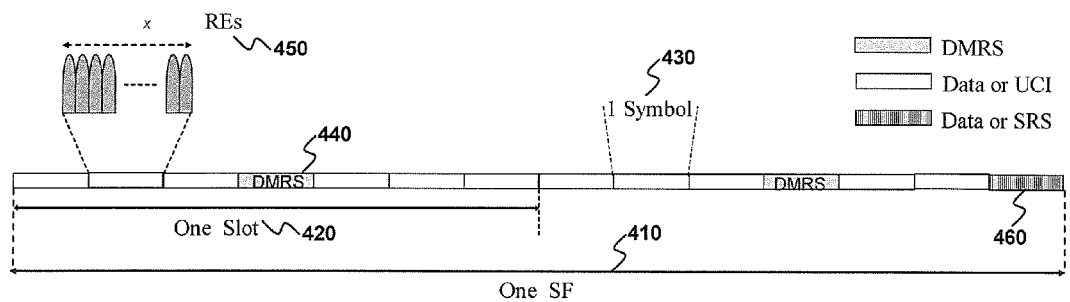
FIG. 4 illustrates an example UL SF structure for PUSCH transmission according to this disclosure.

FIG. 4 illustrates an example UL SF structure for PUSCH transmission according to this disclosure. The embodiment of the UL SF structure shown in FIG. 4 is for illustration only. Other embodiments could be used without departing from the scope of the present disclosure.

UL signaling uses Discrete Fourier Transform Spread OFDM (DFT-S-OFDM). An UL SF 410 includes two slots. Each slot 420 includes $N_{symb}^{UL}$ symbols 430 where UE 116 transmits data information, UCI, or RS. UE 116 uses one or more symbols in each slot to transmit DMRS 440. A transmission BW includes frequency resource units that are referred to as Resource Blocks (RBs). Each RB includes $N_{sc}^{RB}$ (virtual) sub-carriers that are referred to as Resource Elements (REs). UE 116 is assigned $M_{PUSCH}$ RBs 450 for a total of $M_{sc}^{PUSCH} = M_{PUSCH} \cdot N_{sc}^{RB}$ REs for a PUSCH transmission BW. UE 116 is assigned 1 RB for a PUCCH transmission BW. A transmission unit of 1 RB over 1 SF is referred to as a Physical RB (PRB). A last SF symbol can be used to multiplex SRS transmissions 460 from one or more UEs. A number of UL SF symbols available for data/UCI/DMRS transmission is $N_{symb}^{PUSCH}=2\cdot(N_{symb}^{UL}-1)-N_{SRS}\cdot N_{SRS}=1$ if a last UL symbol supports SRS transmissions from UEs that overlap at least partially in BW with a PUSCH transmission BW; otherwise, $N_{SRS}=0$.

Figure 5:
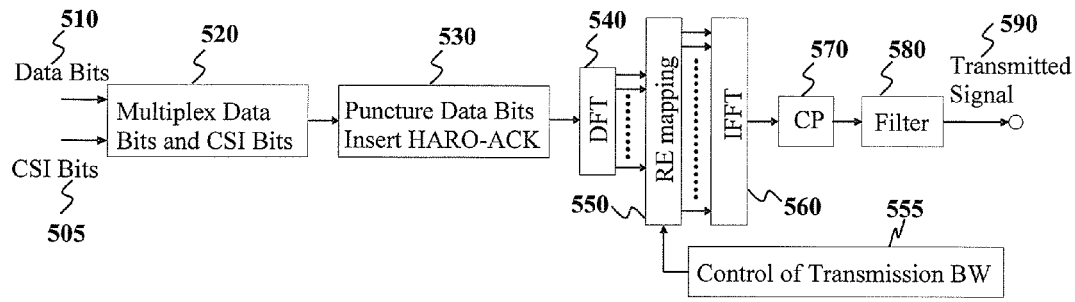
FIG. 5 illustrates an example PUSCH transmitter according to this disclosure.

FIG. 5 illustrates an example PUSCH transmitter according to this disclosure. The embodiment of the PUSCH transmitter shown in FIG. 5 is for illustration only. Other embodiments could be used without departing from the scope of the present disclosure.

Coded CSI bits 505 and coded data bits 510 are multiplexed by multiplexing unit 520. Multiplexing of HARQ-ACK bits is by puncturing data bits or CSI bits (if any) 530 in some REs of the two SF symbols next to the SF symbol used to transmit DMRS in each slot (see also REF 2). Discrete Fourier Transform (DFT) filter 540 provides a DFT of combined data bits and UCI bits, selector 555 selects REs for an assigned PUSCH transmission BW 550, Inverse Fast Fourier Transform (IFFT) filter 560 provides IFFT, Cyclic Prefix (CP) insertion unit 570 inserts a CP insertion, followed by filtering 580, and finally a signal transmission 590.

Figure 6:
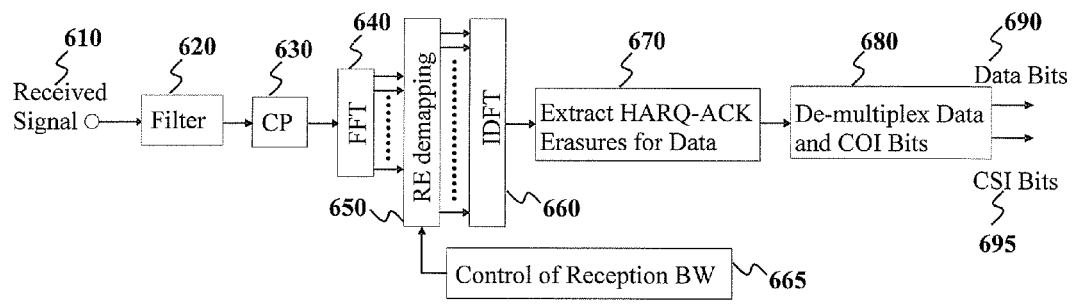
FIG. 6 illustrates an example PUSCH receiver according to this disclosure.

FIG. 6 illustrates an example PUSCH receiver according to this disclosure. The embodiment of the PUSCH receiver shown in FIG. 6 is for illustration only. Other embodiments could be used without departing from the scope of the present disclosure.

A digital signal 610 is filtered by filter 620, CP removal unit 630 removes a CP, FFT filter 640 applies a FFT, selector 655 selects PUSCH REs 650, Inverse DFT (IDFT) filter 600 applies an IDFT, HARQ-ACK extraction unit 670 extracts HARQ-ACK bits and places respective erasures for data bits, and finally demultipexing unit 680 demultiplexes data bits 690 and CSI bits 695.

Several methods exist for UE 116 to convey HARQ-ACK information, in response to reception of data TBs in one or more DL SFs or in one or more cells, including HARQ-ACK spatial or time domain bundling, or both, HARQ-ACK multiplexing based on PUCCH resource selection, and joint coding of HARQ-ACK information bits using, for example, a block code such as a Reed-Mueller (RM) code (see also REF 2 and REF 3). For brevity, HARQ-ACK information in response to a release of SPS PDSCH is not explicitly referred in the following.

Figure 7:
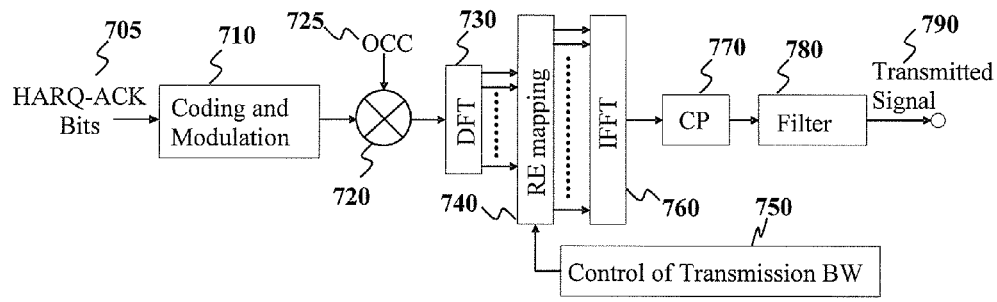
FIG. 7 illustrates an example transmitter for HARQ-ACK signaling in a PUCCH according to this disclosure.

FIG. 7 illustrates an example transmitter for HARQ-ACK signaling in a PUCCH according to this disclosure. The embodiment of the transmitter for HARQ-ACK signaling in a PUCCH shown in FIG. 7 is for illustration only. Other embodiments could be used without departing from the scope of the present disclosure.

HARQ-ACK bits 705 are encoded and modulated by encoding and modulation unit 710 and then multiplied by multiplier 720 with an element of an OCC 725 for a respective DFT-S-OFDM symbol. After DFT precoding by DFT filter 730, selector 750 selects REs of an assigned PUCCH RB 740, IFFT filter 760 performs an IFFT, CP insertion unit inserts a CP 770, and finally the signal is filtered by filter 780 and transmitted by antennas 790.

Figure 8:
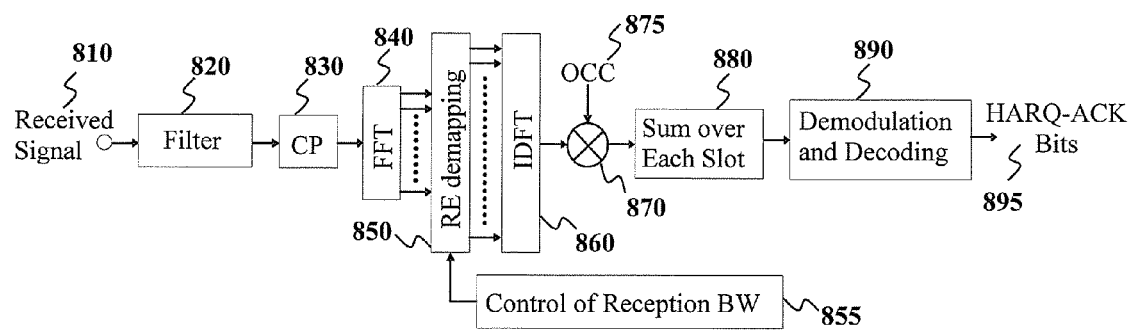
FIG. 8 illustrates an example receiver for HARQ-ACK signaling in a PUCCH according to this disclosure.

FIG. 8 illustrates an example receiver for HARQ-ACK signaling in a PUCCH according to this disclosure. The embodiment of the receiver for HARQ-ACK signaling in a PUCCH shown in FIG. 8 is for illustration only. Other embodiments could be used without departing from the scope of the present disclosure.

A received signal 810 is filtered by filter 820 and a CP is removed by CP unit 830. Subsequently, a FFT is applied by filter 840, REs 850 of an assigned PUCCH RB are selected by selector 855, IDFT filter 860 performs an IDFT, multiplier 870 multiplies an OCC element 575 with a respective DFT-S-OFDM symbol, summer 880 sums outputs for DFT-S-OFDM symbols conveying HARQ-ACK signals over each slot, and a demodulator and decoder unit demodulates and decodes summed HARQ-ACK signals over both SF slots 890 to obtain decoded HARQ-ACK bits 895.

UE 116 measures and reports to eNB 102 signal strengths of serving cells and non-serving cells in order to assist a network in cell selection/reselection and handover. Such measurements include a RS Received Power (RSRP), a RS Received Quality (RSRQ) (see also REF 6), and are typically triggered by eNB 102 through an RRC message to UE 116. For brevity, measurement reports are referred to as RSRP reports and is assumed understood that they also include measurements other than RSRP. UE 116 can be configured by eNB 102 with measurement gap SFs where UE 116 does not receive from or transmit to eNB 102 but instead performs measurements such as RSRP ones for other eNBs.

A power of an UL transmission by UE 116 is controlled by eNB 102 to achieve a desired target for a received Signal to Interference and Noise Ratio (SINR) while reducing interference to neighboring cells and controlling Interference over Thermal (IoT) noise thereby ensuring respective reception reliability targets. UL Power Control (PC) can include an Open-Loop (OL) component with cell-specific and UE-specific parameters and a Closed-Loop (CL) component associated with Transmission Power Control (TPC) commands that eNB 102 provides to UE 116. In SF i, a PUSCH transmission power $P_{PUSCH,c}(i)$, a PUCCH transmission power $P_{PUCCH}(i)$, a SRS transmission power $P_{SRS}(i)$, and a PRACH transmission power $P_{PRACH}(i)$ are determined according to respective UL PC processes (see also REF 3). A transmission power determined according to an UL PC process will be referred to as nominal transmission power. To conserve battery power, UE 116 can be configured by eNB 102 with a Discontinuous Reception (DRX) cycle that can be expressed in a number of frames (see also REF 8). DRX parameters include both a UE-specific DRX cycle (informed to UE 116 by network access stratum signaling) and a cell-specific DRX cycle (informed to UE 116 by broadcast signaling) as well as a number of paging occasions per DRX cycle (see also REF 4).

UE 116 can indicate to eNB 102 an amount of available power through a Power Headroom Report (PHR)—see also REF 3. A PHR can be of Type 1 or Type 2 and can be with respect to a PUSCH transmission, if UE 116 does not transmit PUSCH and PUCCH in a same SF, or with respect to both PUSCH and PUCCH transmissions if UE 116 transmits both PUSCH and PUCCH in a same SF (see also REF 3). A positive PHR value indicates that UE 116 can increase a transmission power while a negative PHR value indicates that UE 116 is power limited. PHR is included in a Medium Access Control (MAC) control element that UE 116 transmits in a PUSCH (see also REF 4).

DL signals include data signals conveying information content, control signals conveying DL Control Information (DCI), and RS. An eNB, such as eNB 102, transmits DL signals using Orthogonal Frequency Division Multiplexing (OFDM). The eNB 102 can transmit data information through Physical DL Shared CHannels (PDSCHs). The eNB 102 can transmit DCI through Physical DL Control CHannels (PDCCHs) or through Enhanced PDCCHs (EPDCCHs)—see also REF 1. For brevity, following descriptions are with reference to PDCCH but, unless explicitly otherwise mentioned, they are also applicable to EPDCCH. The eNB 102 can transmit one or more of multiple types of RS, including a UE-Common RS (CRS), a Channel State Information RS (CSI-RS), and a DeModulation RS (DMRS)—see also REF 1. The eNB 102 can transmit the CRS over a DL system BW. The UE 116 can use the CRS to demodulate data or control signals or to perform measurements. To reduce CRS overhead, eNB 102 can transmit the CSI-RS with a smaller density than the CRS in the time or frequency domain. For channel measurement, Non-Zero Power CSI-RS (NZP CSI-RS) resources can be used. For Interference Measurements (IMs), CSI-IM resources are associated with a Zero Power CSI-RS (ZP CSI-RS). The eNB 102 transmits DMRS only in a BW of a respective PDSCH. The UE 116 can use the DMRS to demodulate information in a PDSCH (or EPDCCH). The RS is associated with a logical antenna port that is mapped to a physical antenna in an implementation specific manner (see also REF 1).

UE 116 stores in a buffer the "soft" values for Log-Likelihood Ratios (LLRs) used for turbo decoding of a data TB associated with each DL HARQ process. Therefore, a soft buffer represents a total memory for UE 116 for decoding data TBs for all DL HARQ processes. The soft buffer is a UE capability as it depends on a maximum data TB size and on a number of data TBs that UE 116 can receive in a SF times a number of DL HARQ processes such as 8 DL HARQ processes (see also REF 2 and REF 3).

A PDSCH transmission to UE 116 or a PUSCH transmission from UE 116 can be either dynamically scheduled or SPS. Dynamic scheduling is triggered by a DCI format conveyed by a PDCCH. SPS PDSCH (or SPS PUSCH) transmission parameters are configured to UE 116 from eNB 102 through higher layer signaling such as Radio Resource Control (RRC) signaling. In all remaining descriptions, unless explicitly noted otherwise, a parameter is configured to a UE by higher layer signaling that includes RRC signaling or MAC signaling while a parameter is dynamically indicated to a UE by a DCI format.

To avoid a PDCCH transmission to UE 116 blocking a PDCCH transmission to another UE, a location of each PDCCH transmission in a time-frequency domain of a DL control region is not unique. As a consequence, UE 116 needs to perform multiple PDCCH decoding operations in a SF to determine whether eNB 102 transmits one or more PDCCHs to UE 116 in the SF. REs carrying a PDCCH are grouped into Control Channel Elements (CCEs) in the logical domain (see also REF 1). REs carrying an EPDCCH are grouped into Enhanced CCEs (ECCEs). For a given number of DCI format bits, a number of CCEs used to transmit a respective PDCCH depends on a channel coding rate where Quadrature Phase Shift Keying (QPSK) is assumed as the modulation scheme. The eNB 102 can use a lower channel coding rate and more CCEs for a PDCCH transmission when UE 116 experiences low DL Signal-to-Interference and Noise Ratio (SINR) than when UE 116 experiences a high DL SINR.

For a PDCCH decoding process, UE 116 can determine a search space for candidate PDCCH transmissions after it restores CCEs in the logical domain according to a UE-common set of CCEs (Common Search Space or CSS) and according to a UE-dedicated set of CCEs (UE-Dedicated Search Space or UE-DSS). A CSS can include first $N_C$ CCEs in the logical domain. A UE-DSS can be determined according to a pseudo-random function having, as inputs, UE-common parameters, such as a SF number or a total number of CCEs in a SF, and UE-specific parameters such as a UE identity (see also REF 3). For example, UE 116 can decode 12 PDCCH candidates on a CSS and 32 or 48 PDCCH candidates on UE-DSS (see also REF 3). These numbers of PDCCH candidates are subsequently referred to as nominal ones.

UE 116 decodes a DCI format 1A for PDSCH scheduling and a DCI format 0 for PUSCH scheduling (see also REF 2). DCI format 0 and DCI format 1A are designed to always have a same size and can be jointly referred to as DCI format 0/1A. Another DCI format, DCI format 1C, can schedule a PDSCH providing System Information Blocks (SIBs) to a group of UEs for network configuration parameters, or a Random Access Response (RAR) to a group of UEs, or paging information to a group of UEs, or provide information for an adaptation of an UL/DL configuration in a TDD cell, and so on. Another DCI format, DCI format 3 or DCI format 3A (jointly referred to as DCI format 3/3A) can provide TPC commands to a group of UEs for transmissions of respective PUSCHs or PUCCHs. All previous DCI formats, with the exception of DCI format 0/1A, are transmitted only in a CSS as they provide control information for a group of UEs (see also REF 2 and REF 3).

One mechanism towards satisfying a demand for increased network capacity and data rates is network densification. This is realized by deploying small cells in order to increase a number of network nodes and their proximity to UEs and provide cell splitting gains. As a number of small cells increases and deployments of small cells become dense, a handover frequency and a handover failure rate can also significantly increase. A UE connection with multiple cells, such as for example when the UE maintains its RRC connection to a macro cell that provides a large coverage area while having a simultaneous connection to a small cell for data offloading, can avoid frequent handovers while allowing for high data rates. By maintaining the RRC connection to the macro-cell, communication with the small cell can be optimized as control-place (C-place) functionalities such as mobility management, paging, and system information updates can be provided only by the macro-cell while a small-cell can be dedicated for user-data plane (U-plane) communications.

An increase in data rates for UE 116 can be supported with simultaneous transmissions over multiple cells using Carrier Aggregation (CA). For example, two carriers with BW of 20 MHz, each corresponding to a cell, can be aggregated for UE 116 to provide communication over a BW of 40 MHz. UE 116 can support both DL and UL transmissions in each cell (symmetric CA) or support only DL transmissions or only UL transmissions in a cell (asymmetric CA). For example, eNB 102 can configure a set of C cells to UE 116 and activate a subset of A cells ($A \leq C$) for PDSCH reception in a SF. In order for UE 116 to always maintain communication with eNB 102, one cell with a DL/UL pair remains always activated and it is referred to as the Primary Cell (PCell). Cells that can be deactivated for UE 116 are referred to as Secondary Cells (SCells) for UE 116. The PCell can be a cell where UE 116 decodes DCI formats for a CSS and transmits PUCCH (see also REF 3).

For operation with UL CA, UE 116 can transmit, in a same SF, PUSCH to multiple cells and PUCCH to a PCell and possibly to a SCell that is referred to as Primary SCell (PSCell). If a total nominal transmission power from UE 116 in SF i is larger than a maximum transmission power $P_{CMAX}(i)$ in SF i, UE 116 first allocates a transmission power to PUCCH, if any. Subsequently, denoting by $\hat{P}$ the linear value of P, if $\hat{P}_{CMAX}(i) - \hat{P}_{PUCCH}(i) > 0$ and for PUSCH in a cell j that conveys UCI, if any, UE 116 allocates a power $P_{PUSCH,j}(i)$. Finally, if $\hat{P}_{CMAX}(i) - \hat{P}_{PUCCH}(i) - \hat{P}_{PUSCH,j}(i) > 0$, UE 116 scales a nominal transmission power of each remaining PUSCH by a same factor w(i) so that $$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i)).$$

UE 116 can scale some PUSCH transmissions with a factor of 0.

An important aspect for a connection of UE 116 over multiple cells is a latency of a backhaul link between eNB 102 of a first cell, such as a macro-cell, and eNB 103 of a second cell, such as a small-cell. If the latency of the backhaul link is practically zero, CA can be used and scheduling decisions can be made by a central scheduler and conveyed to each network node. Moreover, feedback from UE 116 can be received at any network node and conveyed to the central entity to facilitate a proper scheduling decision for UE 116. However, if the latency of the backhaul link is not zero, it is not feasible to use a central scheduler as the latency of the backhaul link will accumulate each time there is communication between a network node and the central scheduler thereby introducing unacceptable delay. Then, it is necessary that scheduling decisions are performed at each network node. Also, feedback signaling from UE 116 associated with scheduling from a network node needs to be received by the same network node. This type of operation is referred to as Dual Connectivity (DC).

Figure 9:
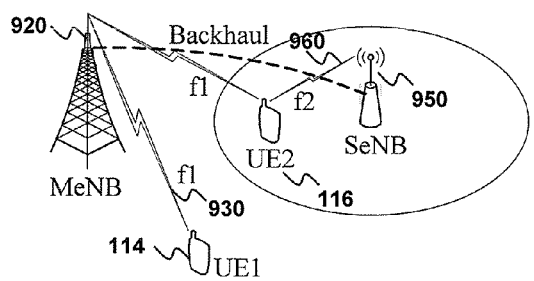
FIG. 9 illustrates an example communication system using dual connectivity according to this disclosure.

FIG. 9 illustrates an example communication system using DC according to this disclosure. The embodiment of DC shown in FIG. 9 is for illustration only. Other embodiments could be used without departing from the scope of the present disclosure.

UE 114 communicates in single connectivity with an eNB of a macro-cell, which can be eNB 102 or similarly configured, that is referred to as Master eNB (MeNB) 920, over a first carrier frequency f1 930. UE 116 communicates in DC both with MeNB 920 over carrier frequency f1 930 and with an eNB of a small cell, which can be eNB 103 or similarly configured, that is referred to as Secondary eNB (SeNB) 950, over carrier frequency f2 960. The MeNB 920 serves a first group of cells that is referred to as Master Cell Group (MCG) and the SeNB 950 serves a second group of cells referred to a Secondary Cell Group (SCG).

When UE 116 operates with DC, UE 116 needs to simultaneously receive DL signaling from or transmit UL signaling to MeNB 920 and from SeNB 950. Also, SeNB 950 needs to provide UE-common control signaling functionalities. Therefore, UE 116 needs to be able to decode DCI formats in a first CSS in MeNB 920 and in a second CSS in SeNB 950. A cell of SeNB 950 where UE 116 decodes DCI formats in a CSS is referred to as PSCell. Monitoring of a CSS in SeNB 950 requires that UE 116 can decode twelve additional PDCCHs compared to when UE 116 operates with CA. If this increase in PDCCH decoding complexity for UE 116 is to be avoided, a partitioning of a UE 116 capability for decoding a number of PDCCH candidates between MeNB 920 and SeNB 950 is needed. Also, in order for UE 116 to be capable to support PDCCH decoding for a variable number of cells in SeNB 950, an allocation of PDCCH candidates according to the number of cells is needed.

For operation with DC, UE 116 can simultaneously transmit to MeNB 920 and to SeNB 950, for example using a different transmit antenna. However, as for CA, a total transmission power a SF i cannot exceed $P_{CMAX}(i)$. Due to their uncoordinated operation, a MeNB 920 scheduler or a SeNB 950 scheduler can either follow a conservative scheduling strategy for UE 116 in order to minimize a probability that a total UE 116 transmission power exceeds $P_{CMAX}(i)$, or follow a more aggressive scheduling strategy that can lead to an increased probability that a total UE 116 transmission power exceeds $P_{CMAX}(i)$ and then UE 116 either drops UL transmissions or reduces their power, thereby resulting to a degradation in a communication quality of service.

UE 116 may need to transmit UCI to MeNB 920 and to SeNB 950 in a SF i where a total nominal transmission power from UE 116 can be larger than $P_{CMAX}(i)$. PUCCH transmissions from UE 116 to SeNB 950 can be in a PSCell. It is beneficial for UE 116 to avoid dropping transmissions of HARQ-ACK information as this can result to potentially multiple PDCCH and PDSCH retransmissions and reduce DL system throughout. It is also beneficial for UE 116 to avoid transmitting HARQ-ACK information with reduced power as it is typically not protected by error detection mechanisms, such as a Cyclic Redundancy Check (CRC), and a decreased HARQ-ACK reception reliability can lead to data buffer corruption (NACK-to-ACK error) or unnecessary PDCCH/PDSCH retransmissions (ACK-to-NACK error). If UE 116 drops a HARQ-ACK transmission to MeNB 920 or SeNB 950 due to a need to reduce a respective power, it is beneficial for UE 116 to provide an associated indication to MeNB 920 or SeNB 950, respectively. This is particularly needed for HARQ-ACK multiplexing in a PUSCH where it may not be possible for MeNB 920 or SeNB 950 to determine an absence of PUSCH transmission or an absence of HARQ-ACK transmission in case UE 116 transmits a PUSCH and MeNB 920 or SeNB 950 expects UE 116 to multiplex HARQ-ACK information in the PUSCH.

UE 116 indicates to MeNB 920 an ability to support CA by indicating a respective UE category that defines both a DL reception capability and an UL transmission capability for UE 116 (see also REF 7). Table 1 provides DL and UL physical layer parameter values for each UE category. With DL CA or UL CA, a maximum number of data TB bits that UE 116 can receive or transmit in a same SF can be shared among multiple cells. A transport channel for data transmission to UE 116 in a SF is referred to as DL Shared CHannel (DL-SCH) and a transport channel for data transmission from UE 116 in a SF is referred to as UL Shared Channel (UL-SCH). A PDSCH is a physical channel of a DL-SCH transport channel and a PUSCH is a physical channel for an UL-SCH transport channel. A size of a data TB (number of TB bits) is referred to as Transport Block Size (TBS).

TABLE 1

DL and UL physical layer parameter values according to UE Category

| UE Category | Maximum number of DL-SCH TB bits | Total number of soft channel bits | Maximum DL number of layers | Maximum number of UL-SCH TB bits |
| --- | --- | --- | --- | --- |
| Category 1 | 10296 | 250368 | 1 | 5160 |
| Category 2 | 51024 | 1237248 | 2 | 25456 |
| Category 3 | 102048 | 1237248 | 2 | 51024 |
| Category 4 | 150752 | 1827072 | 2 | 51024 |
| Category 5 | 299552 | 3667200 | 4 | 75376 |
| Category 6 | 301504 | 3654144 | 2 or 4 | 51024 |
| Category 7 | 301504 | 3654144 | 2 or 4 | 102048 |
| Category 8 | 2998560 | 35982720 | 8 | 1497760 |

Unlike CA, when UE 116 operates with DC a central scheduler cannot coordinate DL transmissions to UE 116 or UL transmissions from UE 116. A total UE 116 processing capability can either be partitioned between MeNB 920 and SeNB 950. Alternatively MeNB 920 and SeNB 950 can schedule UE 116 assuming availability of a full UE 116 capability and UE 116 implementation can handle cases where UE 116 capability is exceeded.

For operation with DC, if a capability of UE 116 is partitioned between MeNB 920 and SeNB 950, MeNB 920 and SeNB 950 can exchange requirements for the UE 116 capability over a backhaul link and MeNB 920 can decide a partitioning for the capability of UE 116. However, due to backhaul latency, such partitioning cannot account for faster adaptations in operating conditions for UE 116 in MeNB 920 or SeNB 950 and can result to a suboptimal utilization of a UE 116 capability. For example, MeNB 920 can allocate to SeNB 950 a two-thirds (⅔) of a UE 116 capability for DL-SCH reception and consider a remaining one-third (⅓) UE 116 capability for DL-SCH reception from MeNB 920. However, in many SFs, UE 116 may not receive PDSCH from MeNB 920 and then the UE 116 capability for DL-SCH reception is underutilized.

Similar to a maximum transmission power limitation, a maximum number of DL-SCH TB bits or a maximum number of UL-SCH TB bits for UE 116 need to be shared between MeNB 920 and SeNB 950 according to a respective capability for UE 116. A soft buffer size of UE 116 for storing soft channel bits for data TBs corresponding to DL HARQ processes (see also REF 2 and REF 3) also needs to be shared between MeNB 920 and SeNB 950.

In a cell using Time Division Duplexing (TDD), a communication direction in some SFs is in the DL and in some other SFs is in the UL. Table 2 provides example UL-DL configurations over a frame period (see also REF 1). "D" denotes a DL SF, "U" denotes an UL SF, and "S" denotes a special SF.

TABLE 2

UL/DL configurations for a TDD system

| UL/DL Configuration | SF number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

To facilitate dual-mode (FDD, TDD) UEs while minimizing a respective UE complexity, a soft buffer size of UE 116 is same in FDD and TDD and is determined by a total number of DL HARQ processes for FDD that is assumed to be eight. In TDD, a maximum number of DL HARQ processes that UE 116 needs to support varies between four and fifteen depending on a UL/DL configuration and is given in Table 3. A soft buffer size for TDD operation is adapted and split into $\min(M_{DL\_HARQ}, 8)$ equal partitions, or into $2 \cdot \min(M_{DL\_HARQ}, 8)$ for PDSCH Transmission Modes (TMs) that support transmission of two data TBs in a PDSCH (see also REF 2 and REF 3). When a number of DL HARQ processes in larger than eight, a UE needs to use statistical soft buffer management in order to minimize a probability of HARQ blocking as a soft bit memory per DL HARQ process is less than in FDD.

TABLE 3

Maximum number of DL HARQ processes for TDD

| UL/DL configuration | Maximum number of HARQ processes $M_{DL\_HARQ}$ |
|---|---|
| 0 | 4 |
| 1 | 7 |
| 2 | 10 |
| 3 | 9 |
| 4 | 12 |
| 5 | 15 |
| 6 | 6 |

In a first approach, sharing between MeNB 920 and SeNB 950 in a SF of one or more capabilities of UE 116 for a maximum transmission power, a maximum number of DL-SCH TBs bits, a maximum number of UL-SCH TBs bits, or a soft buffer capacity can be such that the capabilities of UE 116 are never exceeded. For example, MeNB 920 can assign to SeNB 950 (for example, by signaling over a backhaul link) and configure to UE 116 a maximum power $P_{SeNB}(i)$ for transmissions to SeNB 950 and a maximum power $P_{MeNB}(i)$ for transmissions to MeNB 920 such that $P_{MeNB}(i) + P_{SeNB}(i) \leq P_{CMAX}(i)$. Although the first approach can ensure that a capability for UE 116 is practically never exceeded (with an exception of error cases), a semi-static partitioning can also lead to underutilization of the capability of UE 116.

In a second approach, sharing of one or more of a maximum transmission power, a maximum number of DL-SCH TBs bits, a maximum number of UL-SCH TBs bits, or a soft buffer capacity for UE 116 is such that a respective capability for UE 116 can be exceeded. For example, in scheduling of UE 116, both MeNB 920 and SeNB 950 can assume that UE 116 can receive a maximum number of DL-SCH bits according to a respective capability of UE 116.

In the UL/DL configurations of Table 2, 40% and 90% of SFs per frame are DL SFs (and remaining ones are UL SFs). Despite this flexibility, a semi-static UL/DL configuration that can be updated every 640 msec or less frequently, by signaling of a System Information Block (SIB) or, in case of DL CA and a SCell, by RRC signaling (see also REF 3 and REF 5), may not match well with short-term data traffic conditions in a cell. For ease of reference, such UL/DL configuration will be referred to as nominal UL/DL configuration. Faster adaptation of a UL/DL configuration among the ones in Table 2 can be applied to improve a cell throughput. For example, when there is more DL traffic than UL traffic, an UL/DL configuration can be adapted every 10, 20, 40, or 80 msec to a different UL/DL configuration that includes more DL SFs. Signaling for an adaptation of an UL/DL configuration can be provided by several means including a DCI format conveyed by a PDCCH transmitted in a CSS of a PCell or of a PSCell.

An operating constraint in a faster adaptation of an UL/DL configuration is a possible existence of UEs that cannot be aware of such adaptation. Such UEs are referred to as legacy UEs. Since legacy UEs perform measurements in DL SFs using a CRS, such DL SFs cannot be changed to UL SFs or to special SFs by a faster adaptation of an UL/DL configuration. However, an UL SF can be changed to a DL SF without impacting legacy UEs because an eNB scheduler can ensure that legacy UEs do not transmit any signals in such UL SFs. A DL SF is referred to as a fixed one if the DL SF is a DL SF in a nominal UL/DL configuration. A special SF can only switch to a DL SF. An UL SF is referred to as a fixed one if the UL SF is an UL SF in an UL/DL configuration that is configured to UE 116 for determining UL SFs for HARQ-ACK signal transmissions (see also REF 3); this UL/DL configuration is referred to as DL-reference UL/DL configuration. A SF is referred to as DL flexible SF if the SF is an UL SF in a nominal UL/DL configuration and is adapted to a DL SF. A SF is referred to as UL flexible SF if the SF is an UL SF in a nominal UL/DL configuration and, although it can be adapted to a DL SF in an adapted UL/DL configuration, the SF remains an UL SF. In the following, unless otherwise explicitly mentioned, reference to special SFs is included in reference to DL SFs.

In case transmissions to or receptions from an eNB have time varying characteristics, such as when UE 116 is configured for operation with an adaptive UL/DL configuration at SeNB 950, a semi-static partitioning of a capability for UE 116 that is same for all SFs can be suboptimal as UE 116 can have different requirements for transmissions to or receptions from SeNB 950 in different SFs. For example, a transmission power or a number of UL-SCH TB bits for UE 116 can depend on whether UE 116 experiences DL-dominant or UL-dominant interference in a respective UL SF. For example, a number of DL-SCH TB bits that MeNB 920 can schedule for UE 116 can depend on whether a respective SF is a DL SF or an UL SF in SeNB 950.

A transmission power for a PUSCH/SRS in an UL SF where UE 116 experiences UL-dominant interference can be different than in an UL SF where UE 116 experiences DL-dominant interference. UE 116 can then be configured with two separate UL PC processes; a first UL PC process for a first set of SFs where UE 116 experiences UL-dominant interference, such as SF #2, and a second UL PC process for a second set of SFs where UE 116 experiences DL-dominant interference. Therefore, UE 116 can be configured a first set of SFs and a second set of SFs and respective parameters for a first UL PC process and a second UL PC process (see also REF 3 and REF 5). PUCCH can be transmitted only in SFs where UE 116 experiences UL interference and in such case a second UL PC process for PUCCH transmission is not needed.

One or more embodiments of this disclosure provide mechanisms for enabling a UE configured for operation with DC and having a total nominal power in a SF that exceeds a maximum transmission power for the UE in the SF to transmit HARQ-ACK information. One or more embodiments of this disclosure also provide mechanisms for an eNB to determine whether a UE transmits actual HARQ-ACK information in a PUSCH or whether the UE transmits HARQ-ACK information with reduced power in the PUSCH. One or more embodiments of this disclosure additionally provide criteria for prioritizing power allocation to transmissions from a power limited UE operating with DC according to respective information types. One or more embodiments of this disclosure further provide mechanisms for a UE to support PDCCH decoding in DC operation. One or more embodiments of this disclosure also provide mechanisms for reducing latency in exchanging information of configurations between eNBs in DC operation and for adapting DL/UL scheduling to variations in configurations. One or more embodiments of this disclosure additionally provide mechanisms for partitioning a UE capability for a maximum number of DL-SCH TB bits or a maximum number of UL-SCH TB bits in DC operation. One or more embodiments of this disclosure further provide mechanisms for partitioning a UE soft buffer between eNBs in DC operation. Finally, one or more embodiments of this disclosure provide mechanisms for partitioning a maximum UE transmission power between eNBs in DC operation.

Embodiment 1: Using PUCCH instead of a PUSCH to Transmit HARQ-ACK in Order to HARQ-ACK Transmission under Power Limitation The first embodiment illustrates that when a UE, such as UE 116, needs to transmit HARQ-ACK information in a PUSCH to an eNB, such as SeNB 950, in an SF i and a respective nominal transmission power $P_{SeNB\_PUSCH}(i)$ is larger than an available power for transmissions from UE 116 to SeNB 950 $P_{CMAX\_SeNB}(i)$ (see also REF 9), UE 116 can transmit the HARQ-ACK information in a PUCCH if this requires a respective nominal transmission power $P_{SeNB\_PUCCH}(i)$ that is not larger than $P_{CMAX\_SeNB}(i)$. If $P_{SeNB\_PUCCH}(i)$ is also larger than $P_{CMAX\_SeNB}(i)$, UE 116 can transmit either the PUSCH or the PUCCH. For example, UE 116 can select to drop the PUSCH and transmit the PUCCH with reduced power if $P_{SeNB\_PUCCH}(i) < P_{SeNB\_PUSCH}(i)$.

The descriptions consider that UE 116 can simultaneously transmit to a PCell of MeNB 920 and to a PSCell of SeNB 950. However, same functionalities can apply if the PCell and the PSCell are cells of a same eNB. For simplicity, it is assumed that UE 116 does not transmit any random access preambles in the SF i that are prioritized for power allocation over HARQ-ACK (see also REF 3); otherwise, UE 116 determines an available power to transmit HARQ-ACK to SeNB 950 after subtracting a power required to transmit random access preambles to any eNB.

Due to the PUSCH SF structure and due to any PUCCH SF structure for HARQ-ACK transmission (see also REF 1), a transmission power from UE 116 in order for an eNB to receive HARQ-ACK information with a desired reliability can be much smaller when the HARQ-ACK information is transmitted in a PUCCH than in a PUSCH. This is because with any PUCCH structure, unlike a PUSCH structure, all SF symbols contribute to HARQ-ACK transmission and additional RS improves channel estimation accuracy especially when transmissions from UE 116 experience low SINR (see also REF 1).

Dropping a PUSCH transmission and transmitting HARQ-ACK information in a PUCCH is functionally equivalent to UE 116 not detecting a respective DCI format scheduling the PUSCH transmission in SF i. Therefore, even though UE 116 does not transmit a PUSCH in SF i, UE 116 can still transmit HARQ-ACK information in a PUCCH using a same resource as when UE 116 does not detect any DCI formats scheduling PUSCH transmissions in SF i. Alternatively, a separate resource can be configured to UE 116 for transmitting PUCCH when UE 116 drops PUSCH transmissions in order to implicitly indicate a power limitation for PUSCH transmissions.

Figure 10:
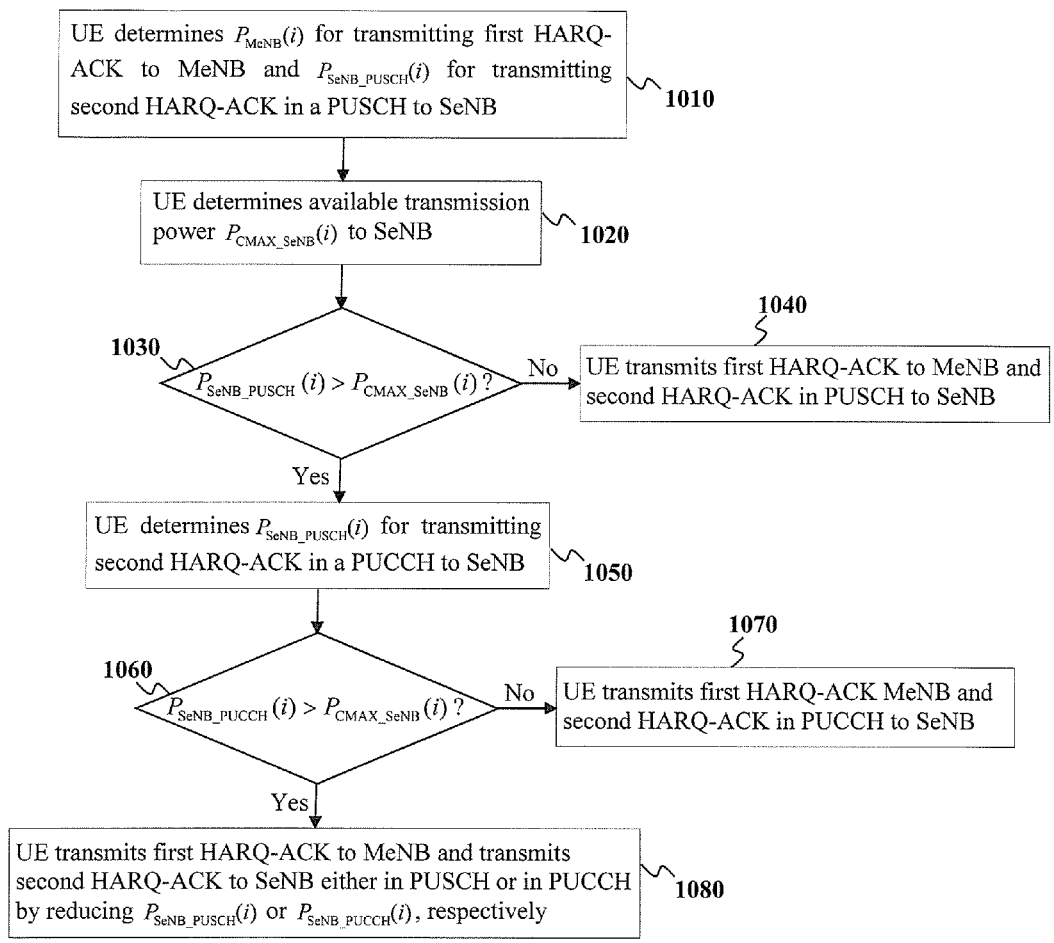
FIG. 10 illustrates a process for a UE to transmit first HARQ-ACK information to a first eNB and transmit second HARQ-ACK information in a PUSCH or in a second PUCCH to a second eNB according to this disclosure.

FIG. 10 illustrates a process for a UE to transmit HARQ-ACK information in a PUSCH or in a PUCCH to an eNB according to this disclosure. While the flow chart depicts a series of sequential steps, unless explicitly stated, no inference should be drawn from the sequence regarding specific order of performance, performance of steps or portions thereof serially rather than concurrently on in an overlapping manner, or performance of the steps depicted exclusively without the occurrence of interleaving or intermediate steps. The process depicted in the example depicted is implemented by processing circuitry in a transmitter chain in, for example, a UE.

In SF i, UE 116 determines a first transmission power $P_{MeNB}(i)$ for transmitting first HARQ-ACK information to a first eNB, such as MeNB 920, and second nominal transmission power $P_{SeNB\_PUSCH}(i)$ for transmitting second HARQ-ACK information in a PUSCH to a second eNB, such as SeNB 950, in block 1010. UE 116 determines $P_{MeNB}(i)$ as the smaller of a first nominal transmission power for transmitting HARQ-ACK in MeNB 920 and an available power that UE 116 has in MeNB 920 (see also REF 9). Based on $P_{MeNB}(i)$ and on $P_{SeNB\_PUSCH}(i)$, UE 116 determines an available transmission power $P_{CMAX\_SeNB}(i)$ for the PUSCH transmission to SeNB 950, in block 1020. For example, $\hat{P}_{CMAX\_SeNB}(i)=\hat{P}_{CMAX}(i)-\hat{P}_{MeNB}(i)$. Subsequently, UE 116 examines whether $P_{SeNB\_PUSCH}(i)$ is larger than $P_{CMAX\_SeNB}(i)$ in block 1030. If $P_{SeNB\_PUSCH}(i) \leq P_{CMAX\_SeNB}(i)$, UE 116 transmits the first HARQ-ACK information to MeNB 920 and the second HARQ-ACK information in the PUSCH to SeNB 950, in block 1040. If $P_{SeNB\_PUSCH}(i) > P_{CMAX\_SeNB}(i)$, UE 116 determines a second nominal transmission power $P_{SeNB\_PUCCH}(i)$ for transmitting the second HARQ-ACK information in a second PUCCH to SeNB 950, in block 1050. UE 116 determines a transmission power and a resource for the PUCCH as if UE 116 did not have any PUSCH transmission to SeNB 950. UE 116 examines whether $P_{SeNB\_PUCCH}(i)$ is larger than a maximum transmission power $P_{CMAX\_SeNB}(i)$ 1060. If $P_{SeNB\_PUCCH}(i) \leq P_{CMAX\_SeNB}(i)$, UE 116 transmits the first HARQ-ACK information to MeNB 920 and the second HARQ-ACK information in the PUCCH to SeNB 950, in block 1070. If $P_{SeNB\_PUCCH}(i) > P_{CMAX\_SeNB}(i)$, UE 116 transmits the first HARQ-ACK information to MeNB 920 and either also transmits the second HARQ-ACK information, either in a PUSCH or in a PUCCH, to SeNB 950 where a transmission power for the PUSCH or the PUCCH is reduced so that it is not larger than $P_{CMAX\_SeNB}(i)$ in block 1080, or UE 116 does not transmit the second HARQ-ACK information.

In general, it is not necessary for UE 116 to transmit in a same SF to both MeNB 920 and SeNB 950 and the first embodiment is also applicable when UE 116 transmits HARQ-ACK only to a single eNB in the SF.

Similar to UE 116 dropping a PUSCH transmission in order to transmit HARQ-ACK in a PUCCH, UE 116 can drop a first PUSCH transmission and multiplex HARQ-ACK in a second PUSCH transmission. For example, if UE 116 has multiple PUSCH transmissions to respective cells of the SCG of SeNB 950 in SF i, UE 116 can be configured to multiplex HARQ-ACK in a PUSCH transmission to a cell with the smallest index, $j_0$, among the respective cells. If $P_{SeNB\_PUSCHj_0}(i) > P_{CMAX\_SeNB}(i)$, UE 116 can drop the PUSCH transmission to cell with index $j_0$ and multiplex HARQ-ACK in a PUSCH transmission to a cell with the next smallest index, $j_1$, among the respective cells if $P_{SeNB\_PUSCHj_1}(i) \leq P_{CMAX\_SeNB}(i)$. If the condition $P_{SeNB\_PUSCH}(i) \leq P_{CMAX\_SeNB}(i)$ is not satisfied for any cell in the SCG where UE 116 is configured to transmit a PUSCH in SF i, then UE 116 can drop all PUSCH transmissions and transmit HARQ-ACK in a PUCCH in the PSCell of SeNB 950 if $P_{SeNB\_PUCCH}(i) \leq P_{CMAX\_SeNB}(i)$.

The condition $P_{SeNB\_PUSCH}(i) > P_{CMAX\_SeNB}(i)$, as in block 1030 of FIG. 10, for UE 116 to determine whether to drop a PUSCH transmission and instead convey HARQ-ACK information in another PUSCH transmission or PUCCH transmission, can be modified as $P_{SeNB\_PUSCH}(i) > P_{CMAX\_SeNB}(i) + T_{HARQ\text{-}ACK}$ where $T_{HARQ\text{-}ACK} > 0$ is a threshold that is either configured to UE 116 by MeNB 920 or determine by UE 116. A different threshold can apply depending on whether UE 116 transmits HARQ-ACK information in a PUSCH or a PUCCH. For example, setting a small threshold value allows UE 116 to transmit a PUSCH conveying HARQ-ACK information when a respective nominal power in larger than an available power only by the small threshold value.

Embodiment 2: Determining by an eNB whether a UE Transmits HARQ-ACK in a PUSCH or Whether a UE Transmits HARQ-ACK with Reduced Power The second embodiment illustrates that a UE, such as UE 116, that needs to transmit in SF i HARQ-ACK information in a PUSCH or in a PUCCH to an eNB, such as SeNB 950, and determines that a respective nominal transmission power is larger than $P_{CMAX}(i)$, transmits the PUSCH or PUCCH, respectively, either with a power that is smaller than or equal to $P_{CMAX}(i)$, or drops a respective transmission, or transmits the HARQ-ACK information with compression if the transmission is in the PUCCH. For example, compression of HARQ-ACK information can be with spatial domain bundling (see also REF 2 or REF 3). Several alternatives are considered to enable SeNB 950 to determine either that a reception reliability of the HARQ-ACK information is reduced (UE transmits with reduced power), or that the PUSCH does not include HARQ-ACK information (UE 116 drops transmission of HARQ-ACK information), or that the PUCCH includes compressed/bundled HARQ-ACK information.

In a first alternative, UE 116 multiplexes HARQ-ACK information in a PUSCH that UE 116 transmits with reduced power. SeNB 950 measures a received PUSCH power, $P_{PUSCH\_rx}(i)$, or a received PUSCH SINR, $SINR_{PUSCH\_rx}(i)$, and compares the measurement to a target (expected) value, $P_{PUSCH\_tg}(i)$ or $SINR_{PUSCH\_tg}(i)$, respectively, that SeNB 950 determines according to a respective UL PC process. The nominal UE 116 transmission power determined by SeNB 950 can be different than a nominal UE 116 transmission power determined by UE 116 due to TPC errors occurring when UE 116 misses or incorrectly detects DCI formats and when SeNB 950 is not aware of such events. The power or SINR measurement at SeNB 950 can be based, for example, on a DMRS that UE 116 transmits in the PUSCH. For brevity, the following descriptions are with reference to a power but can also apply with reference to a SINR by substituting $P_{PUSCH\_rx}(i)$ with $SINR_{PUSCH\_rx}(i)$ and $P_{PUSCH\_tg}(i)$ with $SINR_{PUSCH\_tg}(i)$. In general, the following descriptions can apply with respect to a difference between a measured value and an expected value of a signal metric at an eNB.

If $P_{PUSCH\_rx}(i)$ is smaller than $P_{PUSCH\_tg}(i)$ by a threshold $T_{PUSCH}(i)$, $P_{PUSCH\_tg}(i) - P_{PUSCH\_rx}(i) > T_{PUSCH}(i)$, SeNB 950 can determine that UE 116 transmitted the PUSCH with reduced power. SeNB 950 can then decide to either discard detected HARQ-ACK information (and schedule retransmissions of respective data TBs) or process detected HARQ-ACK information. A decision can be based on additional criteria as subsequently described.

SeNB 950 can consider multiple threshold values depending on whether SeNB 950 correctly or incorrectly decodes one or more data TBs conveyed by the PUSCH. SeNB 950 can determine correct or incorrect decoding of a data TB in a PUSCH by examining a CRC where CRC bits are included in each data TB (see also REF 2). For example, in case a PUSCH conveys one data TB, if a respective CRC check indicates correct decoding of the data TB, SeNB 950 considers a first threshold $T_{PUSCH,1}(i)$; otherwise, SeNB 950 considers a second threshold $T_{PUSCH,2}(i)$ where, for example, $T_{PUSCH,2}(i) \leq T_{PUSCH,1}(i)$. As a reliability of data TB decoding is typically worse than a reliability of HARQ-ACK decoding, SeNB 950 can consider the HARQ-ACK information in a PUSCH to be reliable if SeNB 950 correctly decodes a data TB in the PUSCH. This is equivalent to setting $T_{PUSCH,1}(i)$ to infinity. If a PUSCH conveys two data TBs, a number of thresholds can possibly increase to three with a first threshold corresponding to SeNB 950 correctly decoding both data TBs, a second threshold corresponding to SeNB 950 correctly decoding one data TB, and a third threshold corresponding to SeNB 950 incorrectly decoding both data TBs.

Figure 11:
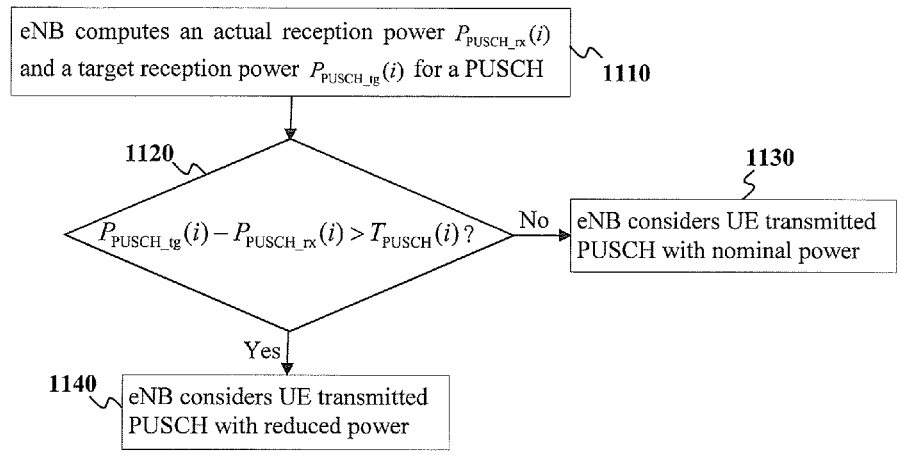
FIG. 11 illustrates a method for an eNB to determine whether a received PUSCH was transmitted with reduced power depending on a measured received power and an expected received power in one or more PUSCH SF symbols according to this disclosure.

FIG. 11 illustrates a method for an eNB to determine whether a received PUSCH was transmitted with reduced power depending on a measured received power and an expected received power in one or more PUSCH SF symbols according to this disclosure. While the flow chart depicts a series of sequential steps, unless explicitly stated, no inference should be drawn from the sequence regarding specific order of performance, performance of steps or portions thereof serially rather than concurrently on in an overlapping manner, or performance of the steps depicted exclusively without the occurrence of interleaving or intermediate steps. The process depicted in the example depicted is implemented by processing circuitry in a receiver chain in, for example, an eNB.

In a SF i, SeNB 950 determines an actual reception power $P_{PUSCH\_rx}(i)$ for a PUSCH transmission from UE 116 and a target (expected) reception power $P_{PUSCH\_tg}(i)$ for the PUSCH transmission from UE 116 according to a respective UL PC process in block 1110. Subsequently, SeNB 950 determines whether $P_{PUSCH\_tg}(i)-P_{PUSCH\_rx}(i)>T_{PUSCH}(i)$ in block 1120 where $T_{PUSCH}(i)$ is set by SeNB 950. If $P_{PUSCH\_tg}(i)-P_{PUSCH\_rx}(i)>T_{PUSCH}(i)$, SeNB 950 can determine that UE 116 transmitted the PUSCH with reduced power (compared to a nominal transmission power) in block 1130; otherwise, SeNB 950 can determine that UE 116 transmitted the PUSCH with a nominal transmission power in block 1140. The threshold $T_{PUSCH}(i)$ can have a fixed value or its value can vary depending, for example, on whether or not SeNB 950 correctly decodes a data TB conveyed by the PUSCH.

In a second alternative, if in a SF i the UE 116 transmits a PUSCH with reduced power, UE 116 selects a CS and OCC value for a DMRS transmission depending on (a) an indicated CS and OCC value, either by a DCI format scheduling the PUSCH transmission or is configured for SPS PUSCH transmission, and (b) whether or not UE 116 transmits the PUSCH with reduced power. The selection of a CS and OCC value by UE 116 can also be conditioned on whether UE 116 multiplexes UCI in the PUSCH. For example, if one of eight CS and OCC values is indicated to UE 116, then UE 116 can use the indicated CS and OCC value if UE 116 transmits the PUSCH with a nominal power or UE 116 can use a CS and OCC value that is, for example, immediately after the indicated CS and OCC value if UE 116 transmits the PUSCH with reduced power (wrap-around to the first CS and OCC value can apply if the indicated CS and OCC value is the eighth one). In case SeNB 950 applies spatial multiplexing among PUSCH transmissions from multiple UEs, SeNB 950 can be restricted to assign at most every other CS and OCC value for respective DMRS transmissions and limit spatial multiplexing of PUSCH transmissions to at most four UEs.

The SeNB 950 can determine a CS and OCC value by computing a respective received power for a DMRS in a PUSCH assuming UE 116 transmits the DMRS with an indicated CS and OCC value, $P_{PUSCH}^{RS\_CSOCC1}(i)$, and assuming UE 116 transmits the DMRS with a CS and OCC value following the indicated one, $P_{PUSCH}^{RS\_CSOCC2}(i)$. Then, if $P_{PUSCH}^{RS\_CSOCC2}(i)-P_{PUSCH}^{RS\_CSOCC1}(i)>T_{CSOCC}(i)$, where SeNB 950 sets a threshold value $T_{CSOCC}(i) \geq 0$, SeNB 950 can assume that UE 116 transmitted the PUSCH with a reduced power; otherwise, SeNB 950 can assume that UE 116 transmitted the PUSCH with a nominal power. SeNB 950 can set the value of $T_{CSOCC}(i)$ depending on an assumed likelihood that UE 116 transmitted the PUSCH with a nominal power. For example, if SeNB 950 correctly decodes a data TB in the PUSCH, SeNB 950 can use a higher value for $T_{CSOCC}(i)$; otherwise, SeNB 950 can use a lower one. For example, if UE 116 can transmit only to SeNB 950 (and cannot transmit to MeNB 920) in SF i, SeNB 950 can use a higher value for $T_{CSOCC}(i)$; otherwise, SeNB 950 can use a lower one.

Figure 12:
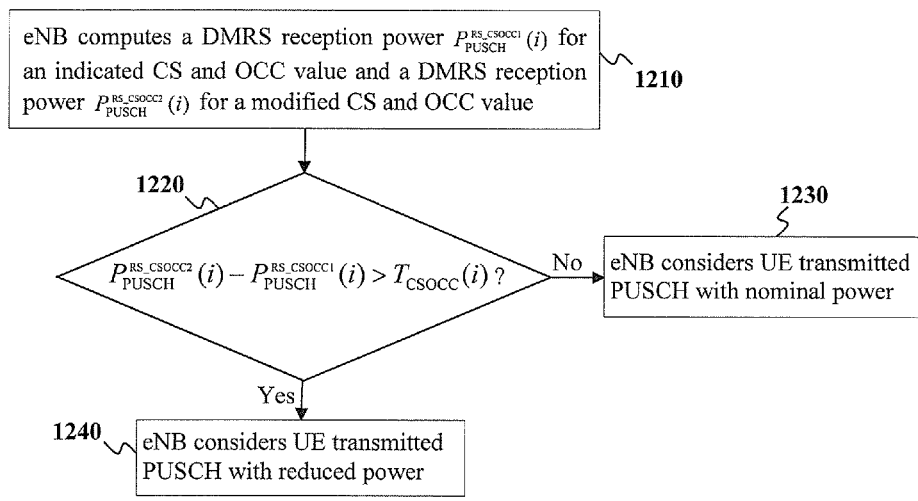
FIG. 12 illustrates a method for an eNB to determine whether a received PUSCH was transmitted with reduced power depending on power measurements for a DMRS reception according to a first CS and OCC value and according to a second CS and OCC value according to this disclosure.

FIG. 12 illustrates a method for an eNB to determine whether a received PUSCH was transmitted with reduced power depending on power measurements for a DMRS reception according to a first CS and OCC value and according to a second CS and OCC value according to this disclosure. While the flow chart depicts a series of sequential steps, unless explicitly stated, no inference should be drawn from the sequence regarding specific order of performance, performance of steps or portions thereof serially rather than concurrently on in an overlapping manner, or performance of the steps depicted exclusively without the occurrence of interleaving or intermediate steps. The process depicted in the example depicted is implemented by processing circuitry in a receiver chain in, for example, an eNB.

SeNB 950 expects UE 116 to transmit a PUSCH in a SF i. For a DMRS reception in the PUSCH, SeNB 950 computes a DMRS reception power $P_{PUSCH}^{RS\_CSOCC1}(i)$ assuming UE 116 transmitted the DMRS according to a CS and OCC value that SeNB 950 indicated to UE 116 and a DMRS reception power $P_{PUSCH}^{RS\_CSOCC2}(i)$ assuming UE 116 transmitted the DMRS with a CS and OCC value that immediately follows the indicated CS and OCC value in block 1210. Subsequently, SeNB 950 determines whether $P_{PUSCH}^{RS\_CSOCC2}(i)-P_{PUSCH}^{RS\_CSOCC1}(i)>T_{CSOCC}(i)$ in block 1220, where $T_{CSOCC}(i)$ is a threshold value set by SeNB 950. If $P_{PUSCH}^{RS\_CSOCC2}(i)-P_{PUSCH}^{RS\_CSOCC1}(i)>T_{CSOCC}(i)$, SeNB 950 determines that UE 116 transmitted the PUSCH with reduced power (compared to a nominal transmission power) in block 1230; otherwise, SeNB 950 determines that UE 116 transmitted the PUSCH with a nominal transmission power in block 1240. The value of $T_{PUSCH}(i)$ can vary depending, for example, on whether or not SeNB 950 correctly decoded a data TB conveyed in the PUSCH.

The first and second alternatives are also applicable in case UE 116 transmits a PUCCH. A respective description is analogous to the one described in FIG. 11 or in FIG. 12 and is not repeated for brevity. For the second alternative, it is noted that only an OCC may apply to the DMRS depending on a PUCCH format.

For either the first or the second alternative and for either HARQ-ACK transmissions in a PUSCH or a PUCCH, UE 116 may apply HARQ-ACK bundling if UE 116 transmits HARQ-ACK information with reduced power. For example, UE 116 does not apply spatial domain bundling to HARQ-ACK information when UE 116 transmits a respective PUSCH or PUCCH with a respective nominal power; otherwise, UE 116 applies spatial domain bundling. This can improve HARQ-ACK reception reliability when a transmission is with reduced power as a respective HARQ-ACK information payload is reduced. SeNB 950 can determine whether or not UE 116 applied additional HARQ-ACK bundling by determining whether or not UE 116 transmitted a respective PUSCH or PUCCH with reduced power, for example according to the method in FIG. 11 or the method in FIG. 12.

In a third alternative, UE 116 transmits a PUSCH with reduced power but does not include HARQ-ACK information in the PUSCH. Instead, UE 116 replaces HARQ-ACK information with a predetermined codeword in order to assist SeNB 950 in determining that UE 116 transmitted the PUSCH with reduced power and did not multiplex HARQ-ACK information. In a first example, the predetermined codeword can be a series of alternating "+1" and "−1" numeric values mapped to REs that are nominally used to transmit HARQ-ACK information (see also REF 2). UE 116 can also change an order of the alternating "+1" and "−1" numeric values in successive SF symbols where HARQ-ACK information is multiplexed by transmitting "+1" in REs of a first SF symbol and a "−1" in REs of a second SF symbol where HARQ-ACK information is multiplexed.

In a second example, the predetermined codeword can be a series of "+1" numeric values mapped to REs that are nominally used to transmit HARQ-ACK information in odd SF symbols and a series of "−1" numeric values mapped to REs that are nominally used to transmit HARQ-ACK information in even SF symbols (that is, UE 116 transmits "+1" in REs of a first and third SF symbols and transmits "−1" in REs of a second and fourth SF symbols that are used for multiplexing HARQ-ACK information). By summing, for example, pairs of codeword REs across respective SF symbols in each SF slot, SeNB 950 can accurately decode the predetermined codeword and determine whether or not UE 116 multiplexed actual HARQ-ACK information. This is because a probability that the predetermined codeword, and its permutations across REs of SF symbols, represents actual HARQ-ACK information is practically zero. Therefore, SeNB 950 can perform two decoding operations for HARQ-ACK information in a PUSCH; a first one assuming UE 116 transmits actual HARQ-ACK information and a second one for a predetermined codeword assuming UE 116 does not transmit actual HARQ-ACK information (and transmits the PUSCH with reduced power).

Figure 13:
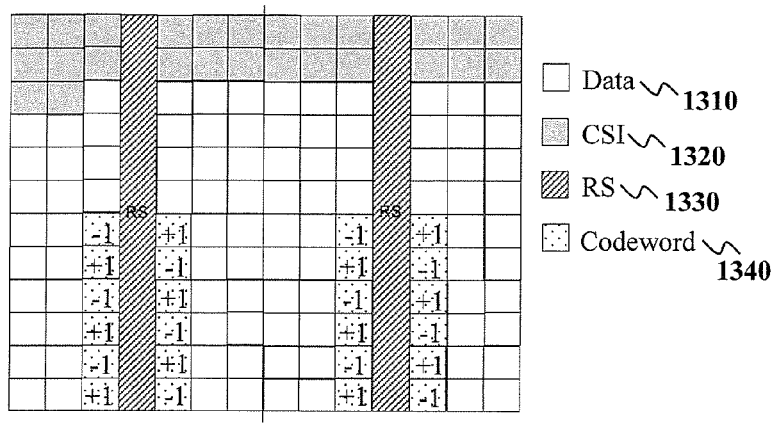
FIG. 13 illustrates a method for a UE to transmit a predetermined codeword that replaces actual HARQ-ACK information in a PUSCH when the UE transmits the PUSCH with a reduced power compared to a nominal power according to this disclosure.

FIG. 13 illustrates a method for a UE to transmit a predetermined codeword that replaces actual HARQ-ACK information in a PUSCH when the UE transmits the PUSCH with a reduced power compared to a nominal power according to this disclosure. The embodiment shown in FIG. 13 is for illustration only. Other embodiments could be used without departing from the scope of the present disclosure.

In SF i, UE 116 transmits a PUSCH that includes data 1310 and/or CSI 1320, RS 1330, and REs where UE 116 multiplexes HARQ-ACK information 1340 (and this is also expected by SeNB 950). If UE 116 determines that it can transmit the PUSCH with a nominal power, UE 116 multiplexes actual HARQ-ACK information. If UE 116 determines that it needs to transmit the PUSCH with a reduced power, compared to the nominal power, UE 116 replaces actual HARQ-ACK information with a predetermined codeword such as one including a series of alternating "+1" and "−1" in REs of odd SF symbols and a series of alternating "−1" and "+1" in REs of even SF symbols where HARQ-ACK is multiplexed.

Embodiment 3: Information Prioritization for Power Scaling

The third embodiment illustrates prioritization rules for power scaling of UL transmissions from a UE according to a respective information type assuming that the UE total nominal transmission power exceeds the UE maximum transmission power in a respective SF prior to power scaling.

A channel (PUSCH or PUCCH) that includes UCI is typically prioritized for power scaling over a PUSCH that includes only data information (see also REF 3). When UE 116 simultaneously transmits a PUCCH and a PUSCH to a same eNB, such as SeNB 950, and both the PUCCH and PUSCH include UCI, higher priority UCI such as HARQ-ACK or SR is included in the PUCCH and for this reason the PUCCH is prioritized in terms of power allocation over the PUSCH. Finally, transmission of any UCI type is prioritized in terms of power allocation over transmission of any SRS type (see also REF 3). For operation with DC, the above power prioritization rules may not always be preferable.

In a first case, UE 116 transmits a first PUSCH to a first eNB, such as MeNB 920, and transmits a second PUSCH to a second eNB, such as SeNB 950, where both the first PUSCH and the second PUSCH do not include UCI. In case of CA, PUSCH transmissions in a same SF that do not include UCI are equally prioritized in terms of power scaling. In case of DC, power prioritization is considered depending on a data information type in each PUSCH. For example, if a first PUSCH includes MAC signaling (see also REF 4) or RRC signaling (see also REF 5) and a second PUSCH only includes application data traffic, UE 116 can prioritize power allocation to first PUSCH. If both the first PUSCH and the second PUSCH include MAC or RRC signaling, UE 116 can either equally allocate available power to each PUSCH (subject to a total power not exceeding a UE 116 maximum transmission power in the SF) or can prioritize power allocation to PUSCH transmitted to MeNB 920. Moreover, UE 116 can prioritize power allocation to a PUSCH transmission that includes MAC signaling or RRC signaling to a first eNB over a PUSCH transmission that includes A-CSI to a second eNB. UE 116 can also prioritize power allocation to a PUSCH transmission that includes MAC signaling or RRC signaling to MeNB 920 over a PUSCH transmission that includes HARQ-ACK to SeNB 950.

In a second case, UE 116 transmits a PUSCH that does not include UCI to a first eNB and transmits a PUCCH to a second eNB. In case of CA, UE 116 prioritizes power allocation to PUCCH (regardless of whether the PUSCH includes UCI—see also REF 3). In case of DC, UE 116 can prioritize power allocation to a PUSCH with MAC or RRC signaling over a PUCCH. This prioritization can be restricted only for the case that the PUCCH conveys P-CSI or can also apply for the case that the PUCCH conveys SR or HARQ-ACK. Also, this prioritization can be restricted only for the case UE 116 transmits the PUSCH to MeNB 920.

In a third case, UE 116 transmits type 1 SRS (A-SRS) to a first eNB and transmits P-CSI to a second eNB. In case of CA, UE 116 prioritizes power allocation to P-CSI transmission and drops A-SRS transmission. In case of DC, it is likely that the first eNB triggers A-SRS transmission from UE 116 in a SF where the second eNB configures UE 116 to transmit P-CSI and a total nominal transmission power from UE 116 exceeds a maximum one in the SF. Then, considering that an A-SRS transmission occurs only in one SF symbol, UE 116 can prioritize power allocation to the A-SRS and transmit P-CSI with reduced power in the overlapping SF symbol. For synchronous DC operation, the overlapping SF symbol is primarily the last SF symbol. This prioritization can be limited to the case that UE 116 transmits the A-SRS to MeNB 920 and transmits P-CSI to SeNB 950. UE 116 can drop an A-SRS transmission to a first eNB if UE 116 transmits HARQ-ACK or SR to a second eNB. This is because unlike P-CSI multiplexing among UEs in a PUCCH, HARQ-ACK or SR multiplexing among UEs in a PUCCH relies on orthogonal multiplexing across symbols of a same SF slot and a reduction in transmission power in one symbol from one or more UEs can have a degrading effect on the orthogonal multiplexing and respectively degrade a HARQ-ACK or SR reception reliability.

In a fourth case, collisions of SRS and P-CSI can be avoided when UE 116 is configured for operation with synchronous DC, by UE 116 puncturing a last SF symbol for P-CSI transmission using PUCCH Format 2 (see also REF 1) to a first eNB in order for UE 116 to transmit SRS to a second eNB and avoid a potential power limitation.

If UE 116 can potentially use multiple rules for prioritization of power allocation in DC operation, a rule can be configured to UE 116, for example by MeNB 920, or be determined in the operation of the communication system. For example, for UL transmissions from UE 116 in a SF, a rule can be to prioritize all PUSCH to MeNB 920 over PUSCH to SeNB 950. Alternatively, UE 116 can prioritize PUSCH to MeNB 920 by default and network configuration can only indicate possible exception rules. A configuration of a rule for UE 116 to use for power allocation prioritization can be extended to other channels or information types that UE 116 transmits to MeNB 920 and to SeNB 950. For example, UE 116 can be configured to prioritize a CSI transmission to MeNB 920 over a SR transmission to SeNB 950 or prioritize a SR transmission to MeNB 920 over a HARQ-ACK transmission to SeNB 950. Alternatively, UE 116 can autonomously choose a rule.

Embodiment 4: Splitting PDCCH Decoding Operations

The fourth embodiment illustrates a UE operating with DC and decoding a first set of DCI formats in a CSS and UE-DSS for cells of a MeNB and a second set of DCI formats in a CSS and UE-DSS for cells of a SeNB.

UE 116 has a fixed maximum capability for a number of PDCCH candidates it can decode in a SF. MeNB 920 can be informed of a UE 116 capability to decode a number of $N_{UE}$ PDCCH candidates per SF either explicitly or implicitly through information of a respective UE category. For example, UE 116 with a capability to communicate with only a single cell can decode a nominal number of PDCCH candidates for one CSS and one UE-DSS while a UE with a CA capability to communicate with C cells can decode a nominal number of PDCCH candidates for one CSS and C UE-DSS. When UE 116 operates with DC, a UE capability to decode a number of PDCCH candidates per SF can be partitioned among cells of MeNB 920 and SeNB 950. Also, UE 116 needs to support two respective CSS, a first one for the PCell of MeNB 920 and a second one for the PSCell of SeNB 950.

In general, when UE 116 is configured for communication with $C_{MeNB}$ cells in MeNB 920 and with $C_{SeNB}$ cells in SeNB 950, in order to support decoding of a nominal number of PDCCH candidates per CCE aggregation level per SF, UE 116 needs to support decoding of $N_{DC}=[12 \cdot 2+(C_{MeNB}+C_{SeNB}) \cdot 32]$ PDCCH candidates per SF. If $N_{UE} \geq N_{DC}$, UE 116 can decode 12 PDCCH candidates in a CSS and 32 PDCCH candidates in each UE-DSS of each eNB. If $N_{UE} < N_{DC}$, UE 116 cannot decode the nominal number of PDCCH candidates for each CCE aggregation level for some or all of $C_{MeNB}+C_{SeNB}$ cells and a partitioning of PDCCH candidates to cells of MeNB 920 and to cells of SeNB 950 is needed.

Upon configuration of UE 116 by MeNB 920 for DC operation, a partitioning of $N_{UE}$ PDCCH candidates into a first number for MeNB 920 and a second number for SeNB 950 can also be configured to UE 116 by MeNB 920. If $N_{UE} \geq N_{DC}$, a configuration for partitioning can have a default value corresponding to a nominal number of PDCCH candidates per CCE aggregation level for a CSS and for each UE-DSS in each respective eNB.

MeNB 920 determines a first number of $N_{UE\_MeNB}$ PDCCH candidates for UE 116 to decode for cells of MeNB 920 and a second number of $N_{UE\_SeNB}$ PDCCH candidates for UE 116 to decode for cells of SeNB 950. MeNB 920 informs SeNB 950 at least of $N_{UE\_SeNB}$. MeNB 920 configures to UE 116 the $N_{UE\_MeNB}$ PDCCH candidates and the $N_{UE\_SeNB}$ PDCCH candidates. Alternatively, SeNB 950 configures to UE 116 the $N_{UE\_SeNB}$ PDCCH candidates for UE 116 to decode for cells of SeNB 950. The configuration can be for a total number of PDCCH candidates $N_{UE\_MeNB}$ for MeNB 920 and $N_{UE\_SeNB}$ for SeNB 950 and then UE 116 can allocate PDCCH candidates for each CCE aggregation level to each cell according to a predetermined mapping, or the configuration can be for a number of PDCCH candidates per CCE aggregation level for each cell of MeNB 920 and each cell of SeNB 950. A number of PDCCH candidates and respective CCE aggregation levels for a CSS on the PCell of MeNB 920 and on the PSCell of SeNB 950 can be a nominal one (12) by default.

For example, when UE 116 operates with CA that includes 2 cells, UE 116 can support decoding for a nominal number of 12+2×32=76 PDCCH candidates. Upon configuration with DC operation by MeNB 920 and for one MeNB cell, one SeNB cell, and for aggregation levels of $\{1, 2, 4, 8\}$ CCEs, 12 PDCCH candidates can be associated with a CSS in the PCell of MeNB 920 and 12 PDCCH candidates can be associated with a CSS in the PSCell of SeNB 950. MeNB 920 can equally partition remaining 76−12−12=52 PDCCH candidates between the cell of MeNB 920 and the cell of SeNB 950. MeNB 920 can configure UE 116 a number of $\{4, 5, 2, 2\}$ PDCCH candidates for respective aggregation levels of $\{1, 2, 4, 8\}$ CCEs for a UE-DSS in the cell of MeNB 920 while SeNB 950 (or MeNB 920) can configure UE 116 a number of $\{5, 5, 2, 1\}$ PDCCH candidates for respective aggregation levels of $\{1, 2, 4, 8\}$ CCEs for a UE-DSS in the cell of SeNB 950. If, instead of a single cell, CA is supported by either MeNB 920 or SeNB 950, a number of PDCCH candidates per CCE aggregation level in a UE-DSS of a cell can be same for all cells or can also be individually configured for each cell and allow for some CCE aggregation levels to have no PDCCH candidates, for example based on a DL SINR for UE 116.

Figure 14:
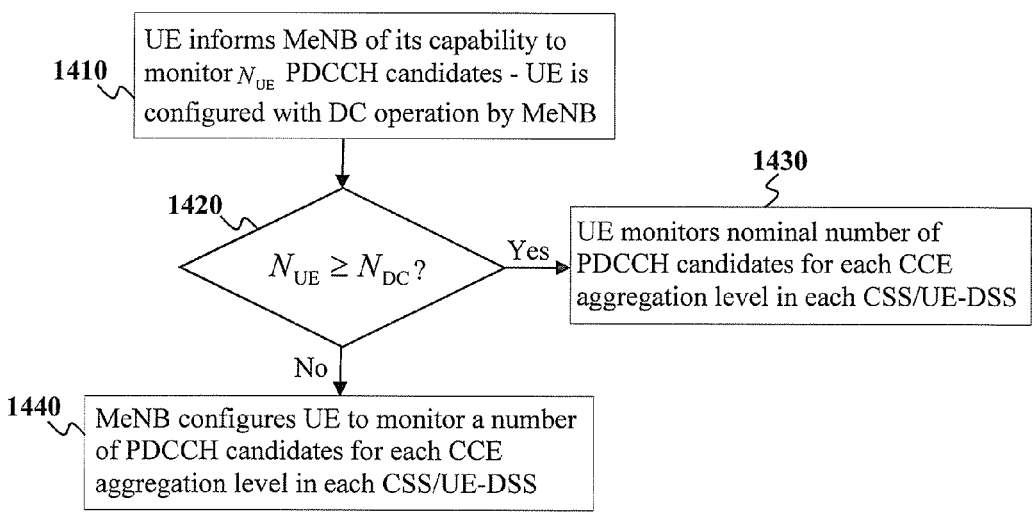
FIG. 14 illustrates a process for a UE configured with DC to determine a number of PDCCH candidates to decode in a UE-DSS of a MeNB and in a UE-DSS of a SeNB according to this disclosure.

FIG. 14 illustrates a process for a UE configured with DC to determine a number of PDCCH candidates to decode in a UE-DSS of a MeNB and in a UE-DSS of a SeNB according to this disclosure. While the flow chart depicts a series of sequential steps, unless explicitly stated, no inference should be drawn from the sequence regarding specific order of performance, performance of steps or portions thereof serially rather than concurrently on in an overlapping manner, or performance of the steps depicted exclusively without the occurrence of interleaving or intermediate steps. The process depicted in the example depicted is implemented by processing circuitry in a transmitter chain in, for example, an eNB.

UE 116 explicitly or implicitly informs MeNB 920 of its capability to decode $N_{UE}$ PDCCH candidates and MeNB 920 configures UE 116 with DC operation in block 1410 that requires UE 116 to decode a total nominal number of $N_{DC}=[12 \cdot 2+(C_{MeNB+C\ SeNB}) \cdot 32]$ PDCCH candidates per SF. MeNB 920, SeNB 950, and UE 116 determine whether or not $N_{UE} \geq N_{DC}$ in block 1420. If $N_{UE \geq N\_DC}$, UE 116 decodes a nominal number of PDCCH candidates for each respective CCE aggregation level in each CSS/UE-DSS in block 1430. If $N_{UE} < N_{DC}$, UE 116 decodes a nominal number of PDCCH candidates for the PCell of MeNB 920 and is configured by MeNB 920 to decode a number of PDCCH candidates for each respective CCE aggregation level in each UE-DSS for each cell of MeNB 920 for a total number of $N_{UE\_MeNB}$ PDCCH candidates. MeNB 920 also informs SeNB 950 of $N_{UE\_SeNB}$ PDCCH candidates that UE 116 can decode for SeNB 950. UE 116 decodes a nominal number of PDCCH candidates for the PSCell of SeNB 950 and is configured by SeNB 950 (or by MeNB 920 if SeNB 950 communicates to MeNB 920 a respective information over a backhaul link) to decode a number of PDCCH candidates for each respective CCE aggregation level in each UE-DSS for each cell of SeNB 950 in block 1440.

In an alternative to the operation in FIG. 14, MeNB 920 can configure to UE 116 the $N_{UE\_MeNB}$ and $N_{UE\_SeNB}$ PDCCH candidates and UE 116 can determine a partition, such as an equal partition, for a number of PDCCH candidates for the UE-DSS of each cell of MeNB 920 and SeNB 950, respectively, after allocating a nominal number of PDCCH candidates for the CSS of the PCell and the CSS of the PSCell. For equal partition, if the number of $N_{UE\_MeNB}$ or $N_{UE\_SeNB}$ PDCCH candidates is not divisible by a number of cells of $C_{UE\_MeNB}$ or $C_{UE\_SeNB}$ that UE 116 can be scheduled in either MeNB 920 or SeNB 950, respectively, then UE 116 can allocate $[(N_{UE\_MeNB}-12)/C_{UE\_MeNB}]$ or $[(N_{UE\_SeNB}-12)/C_{UE\_SeNB}]$ PDCCH candidates for the UE-DSS of the $C_{UE\_MeNB}-1$ or $C_{UE\_SeNB}-1$ cells with the lower indexes for MeNB 920 and SeNB 950, respectively, and allocate $(N_{UE\_MeNB}-12)-(C_{UE\_MeNB}-1)\cdot[(N_{UE\_MeNB}-12)/C_{UE\_MeNB}]$ or $(N_{UE\_SeNB}-12)-(C_{UE\_SeNB}-1)\cdot[(N_{UE\_SeNB}-12)/C_{UE\_SeNB}]$ for the UE-DSS of the cell with the highest index for MeNB 920 or SeNB 950 (assuming that UE 116 allocates twelve PDCCH candidates to each CSS). It is also possible for MeNB 920 or SeNB 950 to configure a number of PDCCH candidates for the CSS or the PCell or the CSS of the PSCell, respectively, or that number can be determined in conjunction with other system properties.

A configuration of PDCCH candidates can also be per DCI format that UE 116 is configured to decode according to a respective PDSCH TM or PUSCH TM. A configuration of PDCCH candidates per CCE aggregation level can also depend on a SF as certain DCI formats can only be transmitted in specific SFs. For example, a DCI Format 1C that schedules a RAR or indicates adapted UL/DL configurations for respective TDD cells can be transmitted only in specific SFs known to UE 116. Therefore, for PDCCH decoding in a CSS, UE 116 can decode 6 PDCCH candidates in SFs DCI Format 1C is not transmitted and decode 12 PDCCH candidates in SFs where DCI Format 1C is transmitted.

A determination of $N_{UE\_MeNB}$ and $N_{UE\_SeNB}$ by MeNB 920 can be performed more than once as, for example, SeNB 950 can modify a number of cells for scheduling of UE 116. If existing values of $N_{UE\_MeNB}$ and $N_{UE\_SeNB}$ become not preferable as SeNB 950 adds or removes cells for UE 116, SeNB 950 can request a different $N_{UE\_SeNB}$ and MeNB 920 can respond with a new value for $N_{UE\_SeNB}$. MeNB 920 or SeNB 950 can then configure to UE 116 a new set of PDCCH candidates for respective CCE aggregation levels for UE-DSS of respective cells. For example, SeNB 950 can change a status of a SeNB 950 cell configured to UE 116 to active or inactive and, as UE 116 does not decode PDCCH for scheduling in an inactive cell, a number of PDCCH candidates for CCE aggregation levels for a UE-DSS of active cells can be re-configured by SeNB 950 (the same applies for cells of MeNB 920).

Alternatively, a different UE capability can be applicable for operation with DC, relative to operation with CA with a same number of cells, at least in terms of a maximum number of PDCCH candidates a UE can decode. A UE capable of DC operation is required to support decoding for twelve additional PDCCH candidates, corresponding to a CSS in a PSCell of a SeNB, relative to a UE supporting CA for communication over a same number of cells. Moreover, a UE with CA capability for N cells may decode PDCCH for N+1 cells assuming, for example, that a same CA capability for N cells is maintained in a SeNB and one cell in the MeNB is primarily used to provide low data rate signaling, such as RRC signaling, and mobility support. A different UE design is then needed to support PDCCH decoding for DC and for CA.

MeNB 920 or SeNB 950 can also configure to UE 116 a different number of PDCCH candidates for a respective CCE aggregation level in a SF depending on knowledge of whether the SF is an UL one or a DL one in a cell in a cell of SeNB 950. As described in FIG. 14, UE 116 can decode a smaller number of PDCCH candidates for a respective CCE aggregation level than a nominal one if $N_{UE} < N_{DC}$. However, in UL SFs of a TDD cell of SeNB 950, UE 116 does not decode PDCCH and a respective number of PDCCH candidates can be reallocated for PDCCH decoding either in cells of SeNB 950 or in cells of MeNB 920. In order for MeNB 920 to utilize a capability of UE 116 to decode additional PDCCH candidates in a SF, MeNB 920 needs to know UL/DL configurations in respective TDD cells of SeNB 950. This information can be provided either by SeNB 950, either through backhaul link signaling or through physical layer signaling, or by UE 116 as it is subsequently discussed. For brevity, if UE 116 decodes PDCCH candidates for scheduling in a cell in a SF, the SF is referred to as being of a second type for the cell; otherwise, the SF is referred to as being of a first type for the cell. For example, if a SF is an UL SF, or a DRX SF, or a measurement gap SF in a cell, it is a first type SF. If it is a SF where UE 116 can receive PDCCH in the cell, it is a second type SF.

For a first type SF, MeNB 920 or SeNB 950 can configure to UE 116 a first number of PDCCH candidates for a given CCE aggregation level per UE-DSS. For a second type SF, MeNB 920 or SeNB 950 can configure to UE 116 a second number of PDCCH candidates for the given CCE aggregation level per UE-DSS, wherein the second number can be smaller than the first number. A SF type can be cell-specific, such as for a DL SF or an UL SF of a TDD cell, or UE-specific such as a DRX or a measurement gap SF. MeNB 920 or SeNB 950 can use a determination of a SF being of a first type for UE 116 to improve a scheduling flexibility by using additional PDCCH candidates for a CCE aggregation level to reduce a PDCCH blocking probability in case CCEs for PDCCH candidates corresponding to a second SF type are wholly or partially used for transmitting other PDCCHs.

Figure 15:
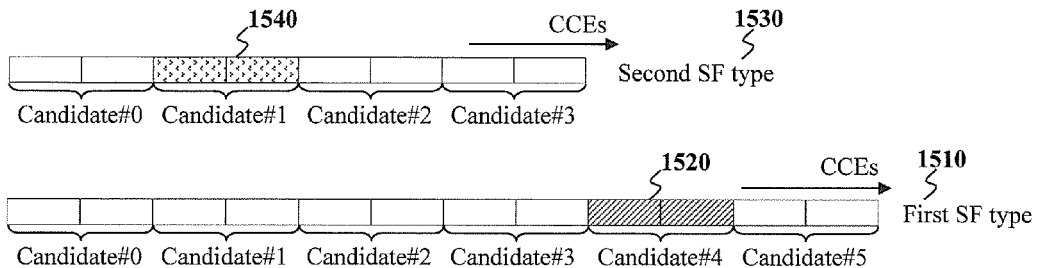
FIG. 15 illustrates a PDCCH decoding process for a UE according to a SF type according to this disclosure.

FIG. 15 illustrates a PDCCH decoding process for a UE according to a SF type according to this disclosure. The embodiment of the PDCCH decoding process for a UE according to a SF type shown in FIG. 15 is for illustration only. Other embodiments could be used without departing from the scope of the present disclosure.

If a SF is of a first type 1510, MeNB 920 determines that UE 116 can decode six PDCCH candidates for an aggregation level of two CCEs. MeNB 920 can transmit a PDCCH to UE 116 using CCEs corresponding to PDCCH Candidate #4 1520. If the SF is of a second type 1530, MeNB 920 determines that UE 116 can decode four PDCCH candidates for an aggregation level of two CCEs, PDCCH Candidate #4 is not available for MeNB 920 to transmit a PDCCH to UE 116, and MeNB 920 uses PDCCH Candidate #1 1540 to transmit a PDCCH to UE 116.

Embodiment 5: Reducing Latency for Informing Changes in Configurations between eNBs in DC and Adapting DC Operation to Configuration Changes The fifth embodiment illustrates adaptations to parameters of DC operation in response to variations of cell-specific or UE-specific configurations. For brevity, descriptions are with reference to a SeNB but they are also applicable with reference to a MeNB. For adaptation of cell-specific or UE-specific configurations occurring in a time-scale that is smaller than or comparable to a latency of a backhaul link between a MeNB and a SeNB, the disclosure considers means other than the backhaul link for informing the MeNB of adaptations in the SeNB. All following descriptions are equally applicable to a PDSCH transmission to or a PUSCH transmission from UE 116, or if the roles of MeNB 920 and SeNB 950 are reversed.

In a first approach, SeNB 950 broadcasts signaling information for a respective adaptation of a configuration for a cell of SeNB 950 with a transmission power that is large enough for the signaling information to be reliably received by MeNB 920. This assumes that MeNB 920 has a receiver tuned to parameters for DL transmissions in a cell of SeNB 950 such as a DL carrier frequency, and so on.

In a second approach, a UE, such as UE 116, operating with DC with MeNB 920 and SeNB 950 can serve as a relay and convey information to MeNB 920 for an adaptation of a cell-specific or UE-specific configuration in one or more cells of SeNB 950.

Figure 16:
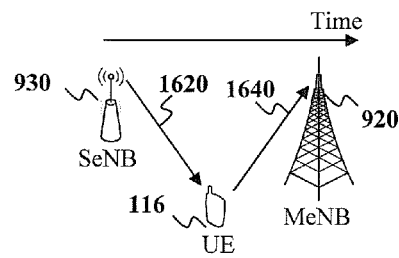
FIG. 16 illustrates a process for a UE to relay information to a MeNB for a cell-specific or UE-specific adaptation of a configuration in one or more cells of a SeNB according to this disclosure.

FIG. 16 illustrates a process for a UE to relay information to a MeNB for a cell-specific or UE-specific adaptation of a configuration in one or more cells of a SeNB according to this disclosure. The embodiment shown in FIG. 16 for the UE to relay information to the MeNB is for illustration only. Other embodiments could be used without departing from the scope of the present disclosure.

SeNB 950 transmits in one of its cells, such as a PSCell, signaling 1620 that is received by UE 116 and provides information for an adaptation of a configuration in one or more cells of SeNB 950. For example, the signaling can be cell-specific broadcast signaling that is received by multiple UEs or can be UE-specific and received only by UE 116. At a subsequent SF, UE 116 includes in a signaling transmission 1640 to MeNB 920 the information for the adaptation of the configuration in the one or more cells of SeNB 950. For example, the signaling can be in a PUSCH or in a PUCCH.

An example case for an adaptation of a configuration in a cell of SeNB 950 that can be communicated by UE 116 to MeNB 920 is an adaptation of an UL/DL configuration in a TDD cell of SeNB 950 (another example case can be an activation or deactivation of cells for UE 116 in SeNB 950). An adaptation of an UL/DL configuration can start at a first SF of a frame and have a validity period (adaptation period) of an integer number of frames, such as one, two, four, or eight frames. SeNB 950 transmits signaling that informs UE 116 of an adapted UL/DL configuration. SeNB 950 can also inform MeNB 920 over a backhaul link of parameters related to the adaptation of an UL/DL configuration in a TDD cell of SeNB 950. For example, such parameters can include each TDD cell of SeNB 950 that adapts an UL/DL configuration, or a respective adaptation periodicity of a UL/DL configuration, or of DL SFs within each adaptation period where SeNB 950 transmits signaling informing of an adapted UL/DL configuration in a respective cell, or of additional parameters that are subsequently described.

UE 116 can provide information of an adapted UL/DL configuration in a TDD cell of SeNB 950 in a MAC control element or in a RRC message transmitted in a PUSCH or in a PUCCH to MeNB 920. For example, MeNB 920 can configure UE 116 with a PUCCH resource for transmitting a PUCCH Format 1b informing of an UL/DL configuration from four predetermined UL/DL configurations. If UE 116 detects a signaling informing of an adapted UL/DL configuration in one or more TDD cells of SeNB 950 in DL SF n, UE 116 can provide this information to MeNB 920 in a first PUSCH transmission or in a first PUCCH transmission in an UL SF at or after an UL SF n+k where, for example, k≥4 for PUSCH or k≥1 for PUCCH. All UEs that can be aware of adapted UL/DL configurations in respective TDD cells of SeNB 950 can inform MeNB 920. Alternatively, MeNB 920 can configure a subset of such UEs to provide that information. If information for adapted UL/DL configurations in respective TDD cells of SeNB 950 is not available to UE 116, for example due to an incorrect detection of an associated signaling from SeNB 950, UE 116 can either indicate this to SeNB 950 in a PUSCH or skip an associated PUCCH transmission.

Figure 17:
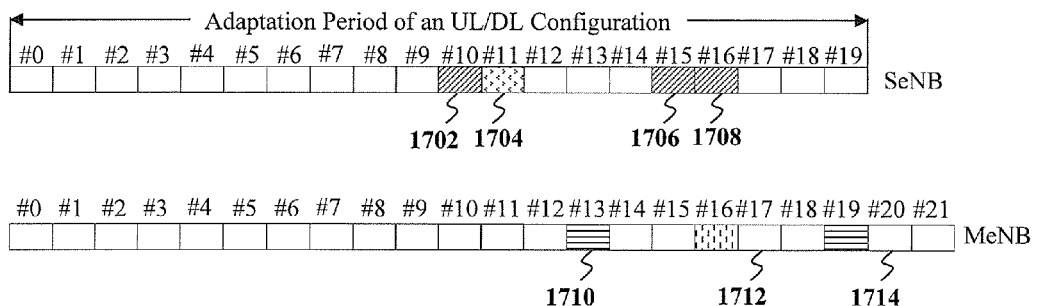
FIG. 17 illustrates a process for a UE to inform a MeNB of an adaptation of a cell-specific configuration in one or more cells of a SeNB according to this disclosure.

FIG. 17 illustrates a process for a UE to inform a MeNB of an adaptation of a cell-specific configuration in one or more cells of a SeNB according to this disclosure. The embodiment shown in FIG. 17 for the UE to inform the MeNB of an adaptation of a cell-specific configuration in one or more cells of the SeNB is for illustration only. Other embodiments could be used without departing from the scope of the present disclosure.

SeNB 950 transmits, for example in a PSCell, signaling informing of an adaptation of cell-specific configuration for one of more cells of SeNB 950 in DL SFs 1702, 1704, 1706, and 1708. UE 116 detects the signaling in SF 1704. For example, UE 116 may be in DRX or may fail to detect the signaling in SF 1702. UE 116 transmits PUSCH or PUCCH to MeNB 920 in one or more of SFs 1710, 1712, and 1714. As SF 1710 occurs two SFs after SF 1704, UE 116 cannot inform of the adapted cell-specific configuration in a PUSCH transmission in SF 1710 but can do so in a PUCCH transmission. As SF 1712 occurs six SFs after SF 1704, UE 116 can inform of the adapted cell-specific configuration in a PUSCH in SF 1712. As SF 1714 occurs after a SF where UE 116 already informed of the cell-specific adapted UL/DL configuration, UE 116 does not need to again include such information in a PUSCH. If MeNB 920 indicates to UE 116 that MeNB 920 did not correctly receive a data TB that UE 116 transmits in a PUSCH in SF 1712, UE 116 can include the information for the adapted cell-specific configuration in a retransmission of the same data TB.

MeNB 920 can use information for a current UL/DL configuration in a TDD cell of SeNB 950, regardless of whether or not the TDD cell of SeNB 950 adapts an UL/DL configuration, to improve communication with UE 116.

MeNB 920 can apply a different scheduling strategy for PDSCH transmissions from UE 116 in a SF depending on knowledge of whether the SF is an UL one or a DL one in a TDD cell of SeNB 950 (synchronous operation at SF level is assumed between MeNB 920 and SeNB 950). For example, if MeNB 920 knows an UL/DL configuration of a TDD cell in SeNB 950 and a first DL SF on MeNB 920 is an UL SF on the TDD cell of SeNB 950, MeNB 920 can schedule a PDSCH transmission to UE 116 in the first DL SF with a larger data TBS than in a second DL SF that is a DL SF on the TDD cell of SeNB 950. This can apply even when link and system conditions for UE 116, such as for example DL channel medium, SINR, buffer status for the scheduler of MeNB 920, are practically same in the first DL SF and the second DL SF. Similar, MeNB 920 can apply a different scheduling strategy for PUSCH transmissions. For example, if a first UL SF on MeNB 920 is a DL SF on the TDD cell of SeNB 950, MeNB 920 can schedule a PUSCH transmission to UE 116 in the first UL SF with a larger data TBS or larger power than in a second UL SF that is an UL SF in the TDD cell of SeNB 950.

Figure 18:
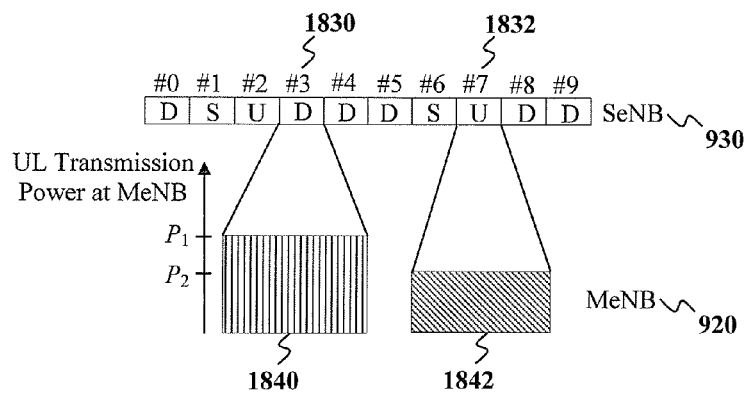
FIG. 18 illustrates a scheduling of a PUSCH transmission from a UE by a first eNB in a SF depending on knowledge by the first eNB of a communication direction in the SF in a cell of a second eNB according to this disclosure.

FIG. 18 illustrates a scheduling of a PUSCH transmission from a UE by a first eNB in a SF depending on knowledge by the first eNB of a communication direction in the SF in a cell of a second eNB according to this disclosure. The embodiment shown in FIG. 18 is for illustration only. Other embodiments could be used without departing from the scope of the present disclosure.

A first eNB, such as MeNB 920, is informed of an UL/DL configuration in a TDD cell of a second eNB, such as SeNB 950. MeNB 920 can obtain this information through a backhaul link or through physical layer signaling from SeNB 950 or through signaling from a UE, such as UE 116, as it was previously described. MeNB 920 can therefore know that in the TDD cell of SeNB 950, SF #3 1830 is a DL SF and SF #7 1832 is an UL SF. Based on this knowledge, MeNB 920 can schedule UL transmissions such as PUSCH transmissions from UE 116 with a total data TBS or a total power $P_1$ in SF #3 1840 that is larger than a total data TBS or a total power $P_2$ for UL transmissions such as PUSCH transmissions that MeNB 920 can schedule from UE 116 in SF #7 1842. Similar, MeNB 920 can transmit to UE 116 a PDSCH in SF #7 1832 that conveys a larger data TBS than a PDSCH in SF #1830. Regardless of synchronous or asynchronous dual connectivity operation if, in SF i, transmissions from UE 116 to MeNB 920 do not overlap with any transmissions from UE 116 to SeNB 950, UE 116 has an available power of $P_{CMAX}(i)$ for transmissions to MeNB 920.

For asynchronous operation between MeNB 920 and SeNB 950, where an SF $i_1$ in MeNB 920 overlaps with SFs $i_2-1$ and $i_2$ in SeNB 950, and MeNB 920 configures UE 116 with a first minimum power that UE 116 always has available for transmissions to MeNB 920 and with a second minimum power that UE 116 always has available for transmissions to SeNB 950 (see also REF 9), if UE 116 determines based on a configuration by higher layer signaling, such as RRC signaling, that UE 116 does not transmit to SeNB 950 in SF $i_2$, UE 116 does not need to reserve the second minimum power from a power available for transmissions to MeNB 920 in SF $i_1$. Then, if UE 116 does not transmit random access preambles (otherwise, UE 116 first allocates power to random access preambles), UE 116 determines an available power $P_{MeNB}(i)$ for transmitting to MeNB 920 in SF $i_1$ as the difference between $P_{CMAX}(i_1,i_2-1)$ and a power UE 116 uses to transmit to SeNB 950 in SF $i_2-1$, $P_{SeNB\_Tx}(i_2-1)$. UE 116 transmits to MeNB 920 in SF $i_1$ with a power $P_{MeNB\_Tx}(i_1)$ determined, in linear terms (denoting by $\hat{P}$ the linear value of P), as the minimum between a respective nominal power $\hat{P}_{MeNB\_nominal}(i_1)$ and the available power $\hat{P}_{MeNB}(i_1) = \hat{P}_{CMAX}(i_1,i_2-1) - \hat{P}_{SeNB\_Tx}(i_2-1)$, or $P_{MeNB\_Tx}(i_1) = \min(\hat{P}_{MeNB\_nominal}(i_1), \hat{P}_{CMAX}(i_1,i_2-1) - \hat{P}_{SeNB\_Tx}(i_2-1))$.

Although an adaptation of a MeNB 920 DL/UL scheduling strategy for UE 116 in a SF was described depending on a knowledge by MeNB 920 of whether the SF is an UL one or a DL one in a TDD cell of SeNB 950, a same principle can apply for any SFs where MeNB 920 knows that UE 116 can or cannot have UL transmissions to or DL receptions from SeNB 950. For example, MeNB 920 and SeNB 950 can independently configure UE 116 respective DRX patterns. By exchanging the DRX patterns (cycles) over a backhaul link, MeNB 920 or SeNB 950 can follow a first UL/DL scheduling strategy in SFs configured to UE 116 as DRX ones in SeNB 950 or MeNB 920 and follow a second UL/DL scheduling strategy in SFs configured to UE 116 as non-DRX ones in SeNB 950 or MeNB 920, respectively, even though an actual DRX pattern for UE 116 can differ from a configured DRX pattern, for example due to PDCCH detection failures by UE 116.

Similar, by exchanging configurations of measurement gap SFs for UE 116 over a backhaul link, MeNB 920 or SeNB 950 can follow a first UL/DL scheduling strategy in SFs configured to UE 116 as measurement gap ones at SeNB 950 or MeNB 920 and follow a second UL/DL scheduling strategy in SFs configured to UE 116 as non-measurement gap ones at SeNB 950 or MeNB 920, respectively. Similar, by exchanging patterns for SPS transmissions to or from UE 116, MeNB 920 or SeNB 950 can follow a first UL/DL scheduling strategy in SFs configured to UE 116 for SPS PDSCH or for SPS PUSCH at SeNB 950 or MeNB 920 and follow a second UL/DL scheduling strategy in SFs configured to UE 116 as ones without SPS PDSCH or SPS PUSCH at SeNB 950 or MeNB 920, respectively. Similar, if MeNB 920 or SeNB 950 can know a number of activated cells for UE 116 in SeNB 950 or MeNB 920, MeNB 920 or SeNB 950 can use this information to predict UL/DL data traffic to UE 116 and adjust UL/DL scheduling such as an UL/DL data TBS, or adjust a transmission power from UE 116 (both can become smaller as a number of activated cells for UE 116 increases), and so on.

UE 116 can also use a different antenna or use all antennas to transmit to, for example SeNB 950, in SFs where UE 116 does not transmit to MeNB 920. For example, if UE 116 is equipped with two transmitter antennas, UE 116 can use a first antenna to transmit to MeNB 920 and use a second antenna to transmit to SeNB 950 in a SF where UE 116 transmits to both MeNB 920 and SeNB 950. In a SF where UE 116 transmits only to SeNB 950, UE can use the first antenna (possibly after re-tuning to the SeNB 950 frequency in case of separate carrier frequencies for MeNB 920 and SeNB 950) instead of the second antenna or use both the first and second antennas to transmit to SeNB 950. This can be beneficial when, for example, the second antenna has a lower effective transmission power than the first antenna due to an antenna gain imbalance as, for example, when the first antenna is external and the second antenna is internal. UE 116 can use the first antenna to transmit to MeNB 920 in order to maintain coverage and a RRC connection to MeNB 920 (this can be either independently determined by UE 116 or configured by MeNB 920) while UE 116 can use the first antenna to transmit to SeNB 950 in SFs it does not transmit to MeNB 920 in order to conserve battery power.

Due to independent schedulers at MeNB 920 and SeNB 950, if a SF is a DL SF or an UL SF, it is possible that UE 116 is scheduled PDSCH transmissions or PUSCH transmissions, respectively, from both MeNB 920 and SeNB 950 and a UE 116 receiver (DL-SCH TB bits) or transmitter (UL-SCH TB bits) capability, respectively, for processing a data TBS needs to be partitioned between MeNB 920 and SeNB 950. This partitioning can be exchanged between MeNB 920 and SeNB 950 through a backhaul link, or can be independently assumed by MeNB 920 and SeNB 950 (including no partitioning), or can be determined by other metrics. A specific method is not material to this disclosure.

SeNB 950 can determine a processing capability per cell for UE 116 depending on an adaptation of a number of activated cells or configured cells for UE 116 in SeNB 950. For example, the processing capability for UE 116 can include a maximum TBS for PDSCH reception (DL-SCH TB bits) or for PUSCH transmission (UL-SCH TB bits) in a cell, a number of PDCCH candidates for a UE-DSS in a cell, and so on. If SeNB 950 adapts a first number of activated cells $A_{SeNB,1}$ for UE 116 to a second number of activated cells $A_{SeNB,2}$ and UE 116 has a total processing capability in SeNB 950 of $T_{SeNB}$, where $T_{SeNB}$ is smaller than or equal to a total capability of UE 116 and $T_{SeNB}$ may or may not be configured to SeNB 950 by MeNB 920, SeNB 950 can adapt a maximum processing capability for UE 116 per active cell from $T_{SeNB}/A_{SeNB,1}$ to $T_{SeNB}/A_{SeNB,2}$ if a maximum processing capability is same for all cells. If activated cells can use BW with different sizes then, for PDSCH receptions or for PUSCH transmissions, a maximum processing capability for UE 116 can be scaled according to a BW size of a cell and SeNB 950 can adapt a maximum processing capability per active cell from $$T_{SeNB} \Big/ \sum_{i=0}^{A_{SeNB,1}} BW_i \text{ to } T_{SeNB} \Big/ \sum_{i=0}^{A_{SeNB,2}} BW_i$$

where $BW_i$ is a BW for cell i. Alternatively, SeNB 950 can adapt a UE 116 processing capability according to a number of configured cells instead of a number of activated cells.

MeNB 920 or SeNB 950 can indicate to UE 116 a processing capability per active cell together with an indication of active cells, among a set of configured cells. In response to the indication, UE 116 can determine a partitioning for its soft buffer to cells of MeNB 920 or cells of SeNB 950.

Figure 19:
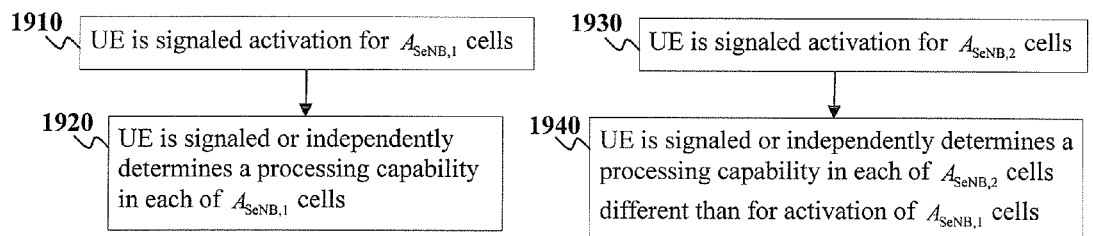
FIG. 19 illustrates an adjustment of a processing capability per active cell for a UE depending on a variation of a number of active cells in an eNB according to this disclosure.

FIG. 19 illustrates an adjustment of a processing capability per active cell for a UE depending on a variation of a number of active cells in an eNB according to this disclosure. While the flow chart depicts a series of sequential steps, unless explicitly stated, no inference should be drawn from the sequence regarding specific order of performance, performance of steps or portions thereof serially rather than concurrently on in an overlapping manner, or performance of the steps depicted exclusively without the occurrence of interleaving or intermediate steps. The process depicted in the example depicted is implemented by processing circuitry in a transmitter chain or receiver chain in, for example, a UE.

UE 116 is signaled by SeNB 950 a number of $A_{SeNB,1}$ active cells from a number of configured cells in block 1910. UE 116 is also signaled or independently determines, based on $A_{SeNB,1}$ and a total processing capability UE 116 considers for SeNB 950, a processing capability for PDSCH receptions or PUSCH transmissions in the $A_{SeNB,1}$ cells in block 1920. UE 116 is signaled by SeNB 950 a number of $A_{SeNB,2}$ active cells from a number of configured cells in block 1930. UE 116 is also signaled or independently determines, based on $A_{SeNB,2}$ and a total processing capability UE 116 considers for SeNB 950, a processing capability for PDSCH receptions or PUSCH transmissions in $A_{SeNB,2}$ cells in block 1940. A processing capability of UE 116 in an active cell is different when a number of active cells is $A_{SeNB,1}$ than when it is $A_{SeNB,2}$ (for $A_{SeNB,1} \neq A_{SeNB,2}$).

Embodiment 6: Partitioning a UE Capability for a Maximum Number of DL-SCH TB Bits or a Maximum Number of UL-SCH TB Bits in DC The sixth embodiment illustrates that SeNB 950 informs MeNB 920 of a nominal UL/DL configuration and of a DL-reference UL/DL configuration for a TDD cell of SeNB 950. Upon receiving this information, MeNB 920 can determine DL fixed SFs and UL fixed SFs in the TDD cell of SeNB 950. It is assumed that MeNB 920 is not explicitly informed of an adapted UL/DL configuration in the TDD cell of SeNB 950. The present embodiment is agnostic to whether or not, for UE 116 configured for operation with DC, a partitioning of a maximum number of DL-SCH TB bits or of a maximum number of UL-SCH TB bits for UE 116 between MeNB 920 and SeNB 950 is such that a respective capability for UE 116 can be exceeded.

MeNB 920 can adjust a maximum number of DL-SCH TB bits transmitted to UE 116 or a maximum number of UL-SCH TB bits transmitted from UE 116 to MeNB 920 according to a SF direction (DL/special or UL) in cells of SeNB 950. If the SF is a DL fixed SF, the MeNB 920 scheduler can account for a likelihood that the SeNB 950 scheduler assigns transmissions of DL-SCHs to UE 116 and then schedule a smaller number of DL-SCH TB bits for UE 116 to receive and a larger number of UL-SCH TB bits for UE 116 to transmit in cells of MeNB 920. If the SF is an UL fixed SF, the MeNB 920 scheduler can account for a likelihood that the SeNB 950 scheduler assigns transmissions of UL-SCHs to UE 116 and schedule a smaller number of UL-SCH TB bits for UE 116 to receive and a larger number of DL-SCH TB bits for UE 116 to transmit in cells of MeNB 920. For asynchronous DC operation, the MeNB 103 scheduler can consider two overlapping SFs in SeNB 950.

Figure 20:
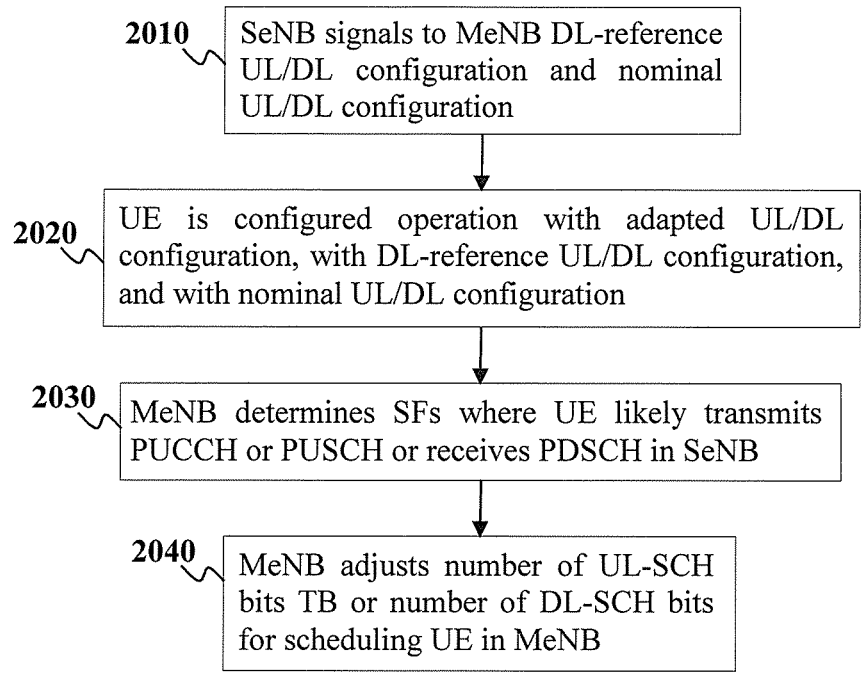
FIG. 20 illustrates a procedure for a MeNB scheduler to determine a number of DL-SCH TB bits for a UE to receive or a number of UL-SCH bits for a UE to transmit in cells of the MeNB based on a nominal UL/DL configuration or based on a DL-reference configuration if the UE is configured in a TDD cell of a SeNB for operation with an adapted UL/DL configuration according to this disclosure.

FIG. 20 illustrates a procedure for a MeNB scheduler to determine a number of DL-SCH TB bits for a UE to receive or a number of UL-SCH bits for a UE to transmit in cells of the MeNB based on a nominal UL/DL configuration or based on a DL-reference configuration if the UE is configured in a TDD cell of a SeNB for operation with an adapted UL/DL configuration according to this disclosure. While the flow chart depicts a series of sequential steps, unless explicitly stated, no inference should be drawn from the sequence regarding specific order of performance, performance of steps or portions thereof serially rather than concurrently on in an overlapping manner, or performance of the steps depicted exclusively without the occurrence of interleaving or intermediate steps. The process depicted in the example depicted is implemented by processing circuitry in a transmitter or receiver chain in, for example, an eNB.

SeNB 950 signals over a backhaul link to MeNB 920 configuration parameters for operation of UE 116 with an adapted UL/DL configuration in a TDD cell of SeNB 950 including a DL-reference UL/DL configuration and a nominal UL/DL configuration in block 2010 that MeNB 920 subsequently configures to UE 116, in block 2020. Based on the DL-reference configuration or on the nominal UL/DL configuration, the MeNB 920 scheduler determines SFs where UE 116 is likely to have PUCCH or PUSCH transmissions or PDSCH receptions in block 2030 in the TDD cell of SeNB 950. Based on this determination, the MeNB 920 scheduler can adjust a number of UL-SCH TB bits transmitted from UE 116 or a number of DL-SCH bits transmitted to UE 116 in cells of MeNB 920 in the SFs in block 2040.

SeNB 950 can also inform MeNB 920 of a first SF set and of a second SF set that are configured to UE 116 for CSI measurements in a cell of SeNB 950. For example, the first SF set can include SFs where UE 116 experiences DL-dominant interference and the second SF set can include SFs where UE 116 experiences UL-dominant interference. As DL-dominant interference is typically larger than UL-dominant interference, SeNB 950 is likely to schedule UE 116 with a larger number of DL-SCH TB bits in a SF from the second SF set than in a SF from the first SF set. The MeNB 920 scheduler can account for this likelihood and can schedule to UE 116 a smaller number of DL-SCH TB bits in a DL SF from the second set of DL SFs and a larger number of DL-SCH bits in a DL SF from the first SF set of DL SFs.

An existence of a first SF set and of a second SF set can apply in general when UE 116 can experience different interference conditions in different SFs and is not limited only to operation with an adapted UL/DL configuration in a TDD cell. For example, in order to support interference coordination, MeNB 920 can reduce, including setting to zero, a transmission power in a macro-cell in some SFs so that a reception reliability of signals transmitted from small cells can be improved. Such SFs are referred to as Almost Blank SFs (ABS). In an ABS, MeNB 920 may transmit only CRS with its nominal power while other signaling is transmitted with reduced power, including zero power. MeNB 920 informs a set of ABS SFs for each respective cell and period of frames to UE 116. MeNB 920 can also provide this information to SeNB 950 and, as MeNB 920 transmits with reduced power (including no transmission) in ABS, the SeNB 950 scheduler can assign a larger number of DL-SCH TB bits to UE 116 in a SF that is an ABS in MeNB 920 and can assign a smaller number of DL-SCH TB bits to UE 116 in a SF that is a non-ABS in MeNB 920. Also UE 116 can apply a different partitioning for its soft buffer between MeNB 920 and SeNB 950 depending on an ABS configuration in one or more cells of MeNB 920 or in one or more cells of SeNB 950.

Figure 21:
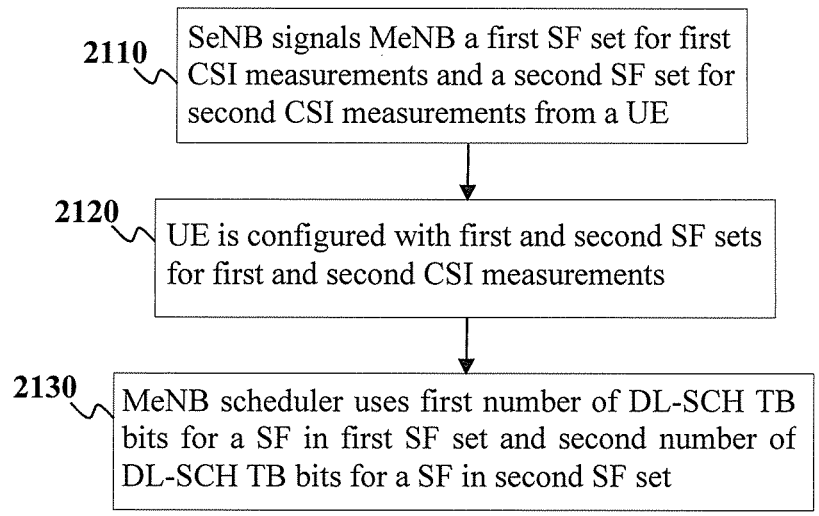
FIG. 21 illustrates a procedure for a MeNB scheduler to determine a number of DL-SCH TB bits to transmit to a UE in cells of the MeNB based on a first SF set and on a second SF set configured for CSI measurement to the UE in a SeNB according to this disclosure.

FIG. 21 illustrates a procedure for a MeNB scheduler to determine a number of DL-SCH TB bits to transmit to a UE in cells of the MeNB based on a first SF set and on a second SF set configured for CSI measurement to the UE in a SeNB according to this disclosure. While the flow chart depicts a series of sequential steps, unless explicitly stated, no inference should be drawn from the sequence regarding specific order of performance, performance of steps or portions thereof serially rather than concurrently on in an overlapping manner, or performance of the steps depicted exclusively without the occurrence of interleaving or intermediate steps. The process depicted in the example depicted is implemented by processing circuitry in a transmitter chain in, for example, an eNB.

SeNB 950 signals over a backhaul link to MeNB 920 a first SF set for first CSI measurements and a second SF set for second CSI measurements in block 2110. MeNB 920 configures to UE 116 the first and second SF sets for respective first and second CSI measurements in block 2120. The MeNB 920 scheduler uses a first number of DL-SCH bits in a first SF from the first SF set and uses a second number of DL-SCH TB bits in a second SF from the second SF set in block 2130 even when a link and system conditions are same for UE 116 in the first SF and in the second SF.

SeNB 950 can also inform MeNB 920 of a first SF set for a first UL PC process and of a second SF set for a second UL PC process that are configured to UE 116. For example, the first SF set can include SFs where UE 116 experiences DL-dominant interference and the second SF set can include SFs where UE 116 experiences UL-dominant interference. As DL-dominant interference is typically larger than UL-dominant interference, SeNB 950 is likely to schedule UE 116 with a larger number of UL-SCH TB bits in a SF from the second SF set than in a SF from the first SF set. The MeNB 920 scheduler can account for this likelihood and can schedule to UE 116 a smaller number of UL-SCH TB bits in an UL SF from the second set of UL SFs and a larger number of UL-SCH bits in an DL SF from the first SF set of UL SFs A partitioning of a maximum DL-SCH TB bits or of a maximum UL-SCH TB bits between MeNB 920 and SeNB 950 can also vary in time and depend on the SF.

In first case, as it was described in the fifth embodiment of this disclosure, the MeNB 920 scheduler can schedule UE 116 with a larger number of DL-SCH TB bits in SFs that are UL SFs in a nominal UL/DL configuration than in SFs that are DL SFs (or special SFs). Similar, the MeNB 920 scheduler can schedule UE 116 with a larger number of UL-SCH TB bits in SFs that are DL SFs (or special SFs) in the nominal UL/DL configuration than in SFs that are UL SFs. For example, under practically identical link or system operating conditions, MeNB 920 can schedule UE 116 with a maximum number of DL-SCH TB bits (according to a respective capability for UE 116) in SFs that are UL SFs in a nominal UL/DL configuration and with a number of DL-SCH TB bits that is smaller than the maximum one in SFs that are DL SFs.

In a second case, SeNB 950 informs MeNB 920 of a DL-reference UL/DL configuration for a TDD cell of SeNB 950 that operates with an adapted UL/DL configuration. As for the first case, the MeNB 920 scheduler can schedule UE 116 with a larger number of DL-SCH TB bits in SFs that are UL SFs in the DL-reference UL/DL configuration than in SFs that are DL SFs (or special SFs). Similar, the MeNB 920 scheduler can schedule UE 116 with a larger number of UL-SCH TB bits in SFs that are DL SFs (or special SFs) in the DL-reference UL/DL configuration than in SFs that are UL SFs. In either case, same operational conditions can be otherwise assumed.

In a third case, SeNB 950 can signal to MeNB 920 a bitmap of SFs where SeNB 950 is likely to schedule UE 116 with a larger number of DL-SCH TB bits (or smaller number of DL-SCH TB bits), such as SFs where UE 116 experiences reduced interference (or increased interference) for DL transmissions. For example, a bitmap value for SFs associated with the larger number of DL-SCH TB bits can be '0' and a bitmap value for SFs associated with the smaller number of DL-SCH TB bits can be '1' (or the reverse). MeNB 920 can schedule UE 116 with a larger number DL-SCH TB bits in SFs with respective bitmap value of '1' than in SFs with respective bitmap value of '0'. Also, MeNB 920 can allocate to SeNB 950 a third and a fourth maximum number of DL-SCH TB bits for scheduling in SFs with respective bitmap value of '1' and '0', respectively, where the third maximum number is larger than the fourth maximum number. MeNB 920 can also provide the above signaling to UE 116 by RRC signaling.

In a fourth case, MeNB 920 can signal to SeNB 950 a bitmap of SFs where MeNB 920 is likely to schedule UE 116 with a larger number of DL-SCH TB bits, such as non-ABS SFs. For a FDD cell two bitmaps can be signaled, a first for DL SFs and a second for UL SFs. For example, a bitmap value for SFs associated with the larger number of DL-SCH TB bits can be '0' and a bitmap value for SFs associated with the smaller number of DL-SCH TB bits can be '0' (or the reverse). SeNB 950 can schedule UE 116 with a larger number DL-SCH TB bits in SFs with respective bitmap value of '1' than in SFs with respective bitmap value of '0'. MeNB 920 can also provide the above signaling to UE 116 by RRC signaling.

In general, regardless of the conditions motivating scheduling with a larger or smaller number of DL-SCH (or UL-SCH) TB bits in a first SF than in a second SF, SeNB 950 or MeNB 920 can inform MeNB 920 or SeNB 950, respectively, of a first SF subset in a SF set where MeNB 920 or SeNB 950 can schedule a larger number of DL-SCH or UL-SCH TB bits. Remaining SFs in the SF set constitute a second SF subset where MeNB 920 or SeNB 950 can schedule a smaller number of DL-SCH or UL-SCH TB bits (including no scheduling). MeNB 920 can assign a first and a second maximum DL-SCH TB bits or UL-SCH TB bits to SeNB 950 for scheduling in the first SF subset and in the second SF subset, respectively. MeNB 920 can also provide this information to UE 116 by RRC signaling. The first and second SF subsets can be explicitly signaled or be implicitly determined from other signaling such as a bitmap indicating ABS and non-ABS for MeNB 920 or SeNB 950 or a UL/DL configuration for each TDD cell of MeNB 920 or SeNB 950, respectively, and so on as it was previously described.

Embodiment 7: Partitioning a UE Soft Buffer between a MeNB and a SeNB

The seventh embodiment illustrates a partitioning of a soft buffer for UE 116 configured for operation with DC between MeNB 920 and SeNB 950. The soft buffer partitioning can depend on a number of DL HARQ processes UE 116 needs to support at MeNB 920 and on a number of DL HARQ processes UE 116 needs to support at SeNB 950. The soft buffer partitioning can also depend on a number of configured cells or activated cells for UE 116 in MeNB 920 and in SeNB 950 and on a configured TM for PDSCH transmissions in each cell. MeNB 920 can assign a percentage for the soft buffer of UE 116 to the SeNB 950 through signaling in the backhaul link. The soft buffer partitioning can also depend on first and second SF subsets from a SF set.

For DL scheduling of UE 116 in a TDD cell of SeNB 950, a number of DL HARQ processes can vary depending on an UL/DL configuration in the TDD cell. If UE 116 is configured for operation with an adaptive UL/DL configuration in the TDD cell, due to a backhaul link signaling latency between MeNB 920 and SeNB 950 that can be comparable to or larger than a validity period of an adapted UL/DL configuration, MeNB 920 can only know a maximum number of DL HARQ processes for UE 116 in the TDD cells as this is determined for a respective DL-reference UL/DL configuration (since a maximum possible number of DL SFs, including special SFs, in an adapted UL/DL configuration is the one of the DL-reference UL/DL configuration). An actual number of DL HARQ processes, as determined by the adapted UL/DL configuration, can be smaller than the maximum one. MeNB 920 can then schedule PDSCH transmissions to UE 116 by considering a soft buffer partitioning at UE 116 based on the maximum number of DL HARQ processes for UE 116 in the TDD cell of SeNB 950 as the DL-reference UL/DL configuration is signaled from SeNB 950 to MeNB 920. If UE 116 is not configured for operation with an adaptive UL/DL configuration in the TDD cell, MeNB 920 can schedule PDSCH transmissions to UE 116 by considering a soft buffer partitioning at UE 116 based on the actual number of DL HARQ processes for UE 116 in the TDD cell of SeNB 950.

From Table 3, a number of DL HARQ processes depends on an UL/DL configuration. Moreover, DL-reference UL/DL configurations that can be used for operation with an adaptive UL/DL configuration are limited to UL/DL configurations 2, 4, and 5 in Table 2 and a respective maximum number of DL HARQ processes is larger than 8 but a soft buffer partitioning is based on at most 8 DL HARQ processes (see also REF 3).

In order to facilitate statistical soft buffer management at UE 116 and minimize a probability of DL HARQ blocking, UE 116 considers the number of DL HARQ processes in the TDD cell of SeNB 950 for a soft buffer partitioning. Moreover, MeNB 920 and SeNB 950 also consider the number of DL HARQ processes in the TDD cell of SeNB 950 in the DL scheduling for UE 116. UE 116 assigns a larger percentage of its soft buffer for DL scheduling in the TDD cells of SeNB 950 when a respective UL/DL configuration supports a larger number of DL HARQ processes and the MeNB 920 scheduler can assume availability of a smaller percentage of the UE 116 soft buffer for PDSCH transmissions to UE 116 and can therefore reduce respective data TBS or a used number of DL HARQ processes. When UE 116 operates with an adapted UL/DL configuration in the TDD cell of SeNB 950, the MeNB 920 scheduler can assume availability of a smaller percentage of the UE 116 soft buffer for PDSCH transmissions to UE 116 when a DL-reference UL/DL configuration has a larger maximum number of DL HARQ processes even though the soft buffer partitioning is based on 8 DL HARQ processes. For example, when the DL-reference UL/DL configuration in the TDD cell of SeNB 950 is UL/DL configuration 5 (having a maximum of 15 DL HARQ processes), the MeNB 920 scheduler can assume availability of a smaller percentage of the UE 116 soft buffer for PDSCH transmissions to UE 116 than when the DL-reference UL/DL configuration in the TDD cell of SeNB 950 is UL/DL configuration 2 (having a maximum of 10 DL HARQ processes).

Figure 22:
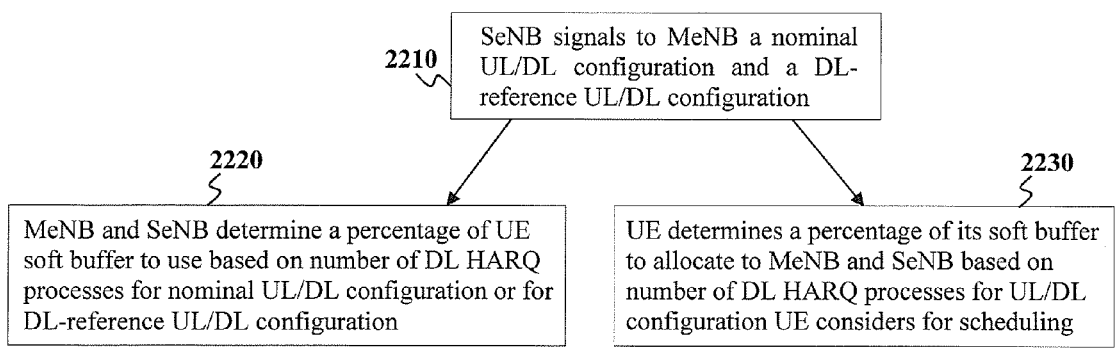
FIG. 22 illustrates a procedure for a MeNB, a SeNB, and a UE to decide the UE soft buffer partitioning between the MeNB and the SeNB according to this disclosure.

FIG. 22 illustrates a procedure for a MeNB, a SeNB, and a UE to decide the UE soft buffer partitioning between the MeNB and the SeNB according to this disclosure. While the flow chart depicts a series of sequential steps, unless explicitly stated, no inference should be drawn from the sequence regarding specific order of performance, performance of steps or portions thereof serially rather than concurrently on in an overlapping manner, or performance of the steps depicted exclusively without the occurrence of interleaving or intermediate steps. The process depicted in the example depicted is implemented by processing circuitry in a transmitter chain in, for example, an eNB or in a receiver chain in, for example, a UE.

SeNB 950 signals over a backhaul link to MeNB 920 a nominal UL/DL configuration for a TDD cell of SeNB 950 or a DL-reference UL/DL configuration when the TDD cell uses an adapted UL/DL configuration to communicate with UE 116 in block 2210. Based on a number of DL HARQ processes for the nominal UL/DL configuration or for the DL-reference UL/DL configuration in the TDD cell, MeNB 920 and SeNB 950 determine, respectively, a percentage of the soft buffer for UE 116 to use for transmissions of DL-SCH TB bits to UE 116, in block 2220. Also, based on a number of DL HARQ processes for an UL/DL configuration UE 116 considers for scheduling in the TDD cell, UE 116 determines a percentage of its soft buffer to assign for DL-SCH TB bits from MeNB 920 or from SeNB 950, in block 2230. For example, the UL/DL configuration can be the nominal UL/DL configuration or an adapted UL/DL configuration.

Although a soft buffer partitioning for UE 116 was described with reference to an UL/DL configuration of a TDD cell of SeNB 950, same principles apply for a number of activated cells or configured cells at MeNB 920 or SeNB 950. For example, for a same DL BW of cells, a soft buffer partitioning for UE 116 between MeNB 920 and SeNB 950 can be proportional to a number of activated cells or configured cells for UE 116 in MeNB 920 and SeNB 950. Moreover, during DRX SFs or measurement gap SFs of UE 116 for MeNB 920 or SeNB 950, UE 116 can assign its entire soft buffer for DL-SCH TB bits from SeNB 950 or MeNB 920, respectively.

A target BLock Error Rate (BLER) for transmissions of DL-SCH TBs to UE 116 from MeNB 920 or from SeNB 950 can also be exchanged between MeNB 920 and SeNB 950 through a backhaul link as it can affect an efficiency of statistical soft buffer management. For example, a higher target BLER for an initial transmission of a data TB increases the likelihood for HARQ retransmissions and requires a larger percentage of the soft buffer for UE 116 in order to reduce HARQ blocking. The target BLER for DL-SCH TBs from MeNB 920 or from SeNB 950 can also be informed to UE 116 that can then consider respective target BLERs in its soft buffer allocation for DL-SCH TBs from MeNB 920 or for DL-SCH TBs from SeNB 950.

Embodiment 8: Partitioning of Maximum UE Transmission Power Between a MeNB and a SeNB The eighth embodiment illustrates a partitioning of a maximum UE transmission power between a MeNB, such as MeNB 920, and a SeNB, such as SeNB 950, when the UE, such as UE 116, is configured with a first SF set where UE 116 applies a first UL PC process and with a second SF set where UE 116 applies a second UL PC process.

Due to the first and second UL PC processes in respective first and second SF sets, a partitioning of $P_{CMAX}(i)$ in SF i between MeNB 920 and SeNB 950 can vary depending on the SF set where SF i belongs. For the first SF set, MeNB 920 can allocate to UE 116 and to SeNB 950 a first minimum available power, $P_{SeNB,1}$ for transmissions to SeNB 950. For the second SF set, MeNB 920 can allocate to UE 116 and to SeNB 950 a second minimum available power, $P_{SeNB,2}$, for transmissions to SeNB 950. Further, in determining $P_{SeNB,1}$ and $P_{SeNB,2}$, MeNB 920 can use an information from SeNB 950 of respective UL PC parameters for UL transmissions in the first SF set and in the second SF set.

Figure 23:
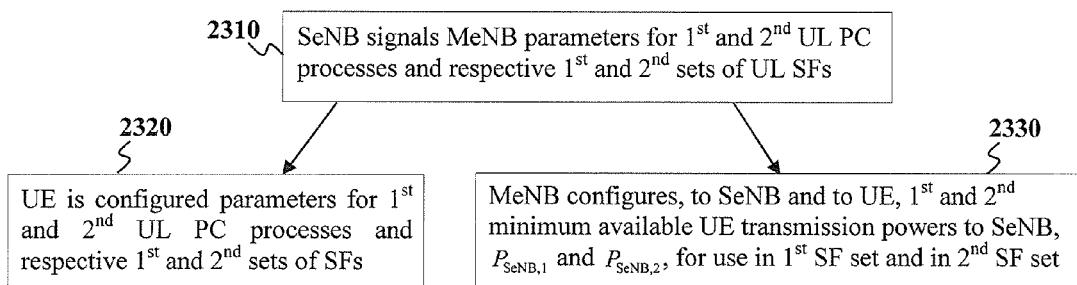
FIG. 23 illustrates a method for a MeNB to allocate to a UE and to a SeNB a first minimum available power and a second minimum available power for transmissions to SeNB in a first SF set and in a second SF set, respectively, according to this disclosure.

FIG. 23 illustrates a method for a MeNB to allocate to a UE and to a SeNB a first minimum available power and a second minimum available power for transmissions to SeNB in a first SF set and in a second SF set, respectively, according to this disclosure. While the flow chart depicts a series of sequential steps, unless explicitly stated, no inference should be drawn from the sequence regarding specific order of performance, performance of steps or portions thereof serially rather than concurrently on in an overlapping manner, or performance of the steps depicted exclusively without the occurrence of interleaving or intermediate steps. The process depicted in the example depicted is implemented by processing circuitry in a transmitter chain in, for example, a UE.

SeNB 950 signals to MeNB 920, through a backhaul link, parameters for a first UL PC process, parameters for a second UL PC process, and respective first SF set and second SF set in block 2310. UE 116 is configured the first SF set, the second SF set, the parameters for first UL PC process for UL transmissions in first SF set, and parameters for second UL PC process for UL transmissions in second SF set in block 2320. Based on this information, MeNB 920 allocates to UE 116 and to SeNB 950 a first minimum guaranteed power and a second minimum guaranteed power, $P_{SeNB,1}$ and $P_{SeNB,2}$ respectively, for UL transmissions from UE 116 to SeNB 950 in the first SF set and in the second SF set, respectively in block 2330.

If UE 116 experiences significantly larger DL interference in the second SF set than in the first SF set, a required transmission power in a SF from the second SF set can be significantly larger than a required transmission power in a SF from the first SF set. To avoid a significant reduction in an available power that UE 116 has for transmissions to MeNB 920 in a SF from the second SF set, either SeNB 950 can suspend scheduling transmissions from UE 116 in the SF or MeNB 920 can reject a request for allocating to SeNB 950 a minimum guaranteed power $P_{SeNB,2}$ in the second SF set.

When UE 116 is configured for operation with an adapted UL/DL configuration in a TDD cell of SeNB 950, a DL-reference UL/DL configuration for PUCCH transmissions by UE 116 creates a third type of SFs where UE 116 can transmit PUCCH and a fourth type of SFs where UE 116 does not transmit PUCCH. Then UE 116 needs to report both Type 1 PHR and Type 2 PHR. As Type 1 PHR is applicable for SFs where UE 116 can transmit only PUSCH while Type 2 is applicable for SFs where UE 116 can transmit both PUSCH and PUCCH, a PHR for transmissions in SeNB 950 for the third set of SFs can correspond to transmission of both PUSCH and PUCCH and a PHR for the fourth set of SFs can correspond to transmission of only PUSCH by UE 116. Type 1 PHR and Type 2 PHR can correspond to actual or to virtual PUSCH/PUCCH transmissions (actual PHR or virtual PHR, respectively).

Although the present disclosure has been described with example embodiments, various changes and modifications may be suggested to one skilled in the art. It is intended that the present disclosure encompass such changes and modifications that fall within the scope of the appended claims.

What is claimed is:
1. A method comprising:
generating, by a User Equipment (UE), first acknowledgement information in response to a reception of first data transport blocks;
determining, by the UE, a first power for transmitting a first physical uplink shared channel (PUSCH) in a subframe (SF) in a first cell from a first cell group according to a first power control formula, a first power for transmitting a first physical uplink control channel (PUCCH) in the SF in a primary cell of the first cell group according to a second power control formula, and a first available power for transmitting in the SF in the first cell group;
comparing, by the UE, the first power for transmitting the first PUSCH and the first available power or the first power for transmitting the PUCCH and the first available power;
transmitting, by the UE, the first acknowledgement information either in the first PUSCH if the first power for transmitting the first PUSCH is smaller than or equal to the first available power, or in the first PUCCH if the first power for transmitting the first PUSCH is larger than the first available power and the first power for transmitting the first PUCCH is smaller than or equal to the first available power.

2. The method of claim 1, wherein the UE:
generates second acknowledgement information in response to a reception of second data transport blocks;
determines a second power for transmitting the second acknowledgement information in a second PUSCH or a second PUCCH according to respective power control formulas, and a second available power for transmitting in the SF in a second cell group; and transmits the second acknowledgement information with a third power, wherein the UE determines the third power as the smaller of the second power and the second available power and the UE determines the first available power as the difference of a maximum available power in the SF and the third power.

3. The method of claim 1, wherein the UE determines a second power for transmitting a second PUSCH in the SF in a second cell from the first cell group according to a third power control formula, the UE transmit the first acknowledgement information in the second PUSCH if the second power for transmitting the second PUSCH is smaller than or equal to the first available power, and the UE transmits the first acknowledgement information in the first PUSCH if the second power for transmitting the second PUSCH is larger than the first available power and the first power for transmitting the first PUSCH is smaller than or equal to the first available power.

4. The method of claim 1, wherein for comparing, the UE adds a positive value to the first available power.

5. A User Equipment (UE) comprising:
a receiver configured to receive first data transport blocks and generate respective first acknowledgement information;
one or more processors configured to:
compute a first power for transmitting a first physical uplink shared channel (PUSCH) in a subframe (SF) in a first cell from a first cell group according to a first power control formula, a first power for transmitting a first physical uplink control channel (PUCCH) in the SF in a primary cell of the first cell group according to a second power control formula, and a first available power for transmitting in the SF in the first cell group; and
determine if the first power for transmitting the first PUSCH is smaller than or equal to the first available power, or if the first power for transmitting the first PUCCH is smaller than or equal to the first available power; and a transmitter configured to transmit the first acknowledgement information in the first PUSCH if the first power for transmitting the first PUSCH is smaller than or equal to the first available power, or in the first PUCCH if the first power for transmitting the first PUSCH is larger than the first available power and the first power for transmitting the first PUCCH is smaller than or equal to the first available power.

6. The UE of claim 5, wherein the receiver is configured to receive second data transport blocks and generates respective second acknowledgement information, the processor is configured to compute a second power for transmitting the second acknowledgement information in a second PUSCH or a second PUCCH according to respective power control formulas, and a second available power for transmitting in the SF in a second cell group, and the transmitter is configured to transmit the second acknowledgement information with a third power, wherein the processor is configured to compute the third power as the smaller of the second power and the second available power and the processor is configured to compute the first available power as the difference of a maximum available power in the SF and the third power.

7. The UE of claim 5, wherein the processor is configured to compute a second power for transmitting a second PUSCH in the SF in a second cell from the first cell group according to a respective power control formula, the transmitter is configured to transmit the first acknowledgement information in the second PUSCH if the second power for transmitting the second PUSCH is smaller than or equal to the first available power, and the transmitter is configured to transmit the first acknowledgement information in the first PUSCH if the second power for transmitting the second PUSCH is larger than the first available power and the first power for transmitting the first PUSCH is smaller than or equal to the first available power.

8. The UE of claim 5, wherein the comparator is configured to add a positive value to the first available power.

* * * * *